US012619596B2

(12) United States Patent
Truong et al.

(10) Patent No.: US 12,619,596 B2
(45) Date of Patent: May 5, 2026

(54) AUTOMATICAL GENERATION AND MAINTENANCE OF DATA CARDS FOR DATASETS

(71) Applicant: NVIDIA Corporation, Santa Clara, CA (US)

(72) Inventors: Kimberly Le Truong, Santa Clara, CA (US); Arun George Zachariah, San Jose, CA (US); Rajat Keshri, Belmont, CA (US); Michael Boone, Los Gatos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/825,954

(22) Filed: Sep. 5, 2024

(65) Prior Publication Data

US 2026/0064657 A1 Mar. 5, 2026

(51) Int. Cl.
*G06F 16/21* (2019.01)
*G06F 16/23* (2019.01)

(52) U.S. Cl.
CPC ........ *G06F 16/2358* (2019.01); *G06F 16/212* (2019.01)

(58) Field of Classification Search
None
See application file for complete search history.

(56) References Cited

U.S. PATENT DOCUMENTS

| | | |
|---|---|---|
| 11,182,649 B2 | 11/2021 | Tremblay et al. |
| 2021/0142177 A1 | 5/2021 | Mallya et al. |
| 2021/0303584 A1* | 9/2021 | Fan ..................... G06F 16/2291 |
| 2022/0122001 A1 | 4/2022 | Choe et al. |
| 2022/0138568 A1 | 5/2022 | Smoyanskiy et al. |
| 2024/0020580 A1 | 1/2024 | Brower |

OTHER PUBLICATIONS

Mitchell, Margaret, et al., "Model Cards for Model Reporting", ACM FAT*, Jan. 29-31, 2019, pp. 220-229. (Year: 2019).*
Pushkarna, Mahima, et al., "Data Cards: Purposeful and Transparent Dataset Documentation for Responsible AI", Jun. 21-24, 2022, ACM FAccT, pp. 1776-1786. (Year: 2022).*

(Continued)

*Primary Examiner* — Scott A. Waldron
(74) *Attorney, Agent, or Firm* — IRON SUMMIT IP LLP

(57) ABSTRACT

In various examples, techniques for automatically generating and maintaining data cards for datasets is described herein. Systems and methods are disclosed that process a dataset in order to identify relevant information associated with the dataset. For example, the dataset may include and/or be associated with sources of information—such as files, documents, links, memos, research papers, annotations, labels, and/or the like—that describe data instances (e.g., images, audio clips, point clouds, etc.) included in the dataset. These sources of information may then be analyzed to retrieve the relevant information associated with the dataset. Systems and methods are then further disclosed that may use one or more language models to process input data associated with the relevant information in order to generate a data card associated with the dataset.

20 Claims, 17 Drawing Sheets

(56)            References Cited

OTHER PUBLICATIONS

Liu, Jiarui, et al., "Automatic Generation of Model and Data Cards: A Step Towards Responsible AI", Jun. 16-21, 2024, Proceedings of the 2024 Conference of the North American Chapter of the Association for Computational Linguistics, vol. 1: Long Papers, pp. 1975-1997. (Year: 2024).*

Rahrooh, Al, et al., "Towards a framework for interoperability and reproducibility of predictive models", Elsevier, Journal of Biomedical Informatics, vol. 149 (Jan. 2024), Article 104551, 9 pages. (Year: 2024).*

* cited by examiner

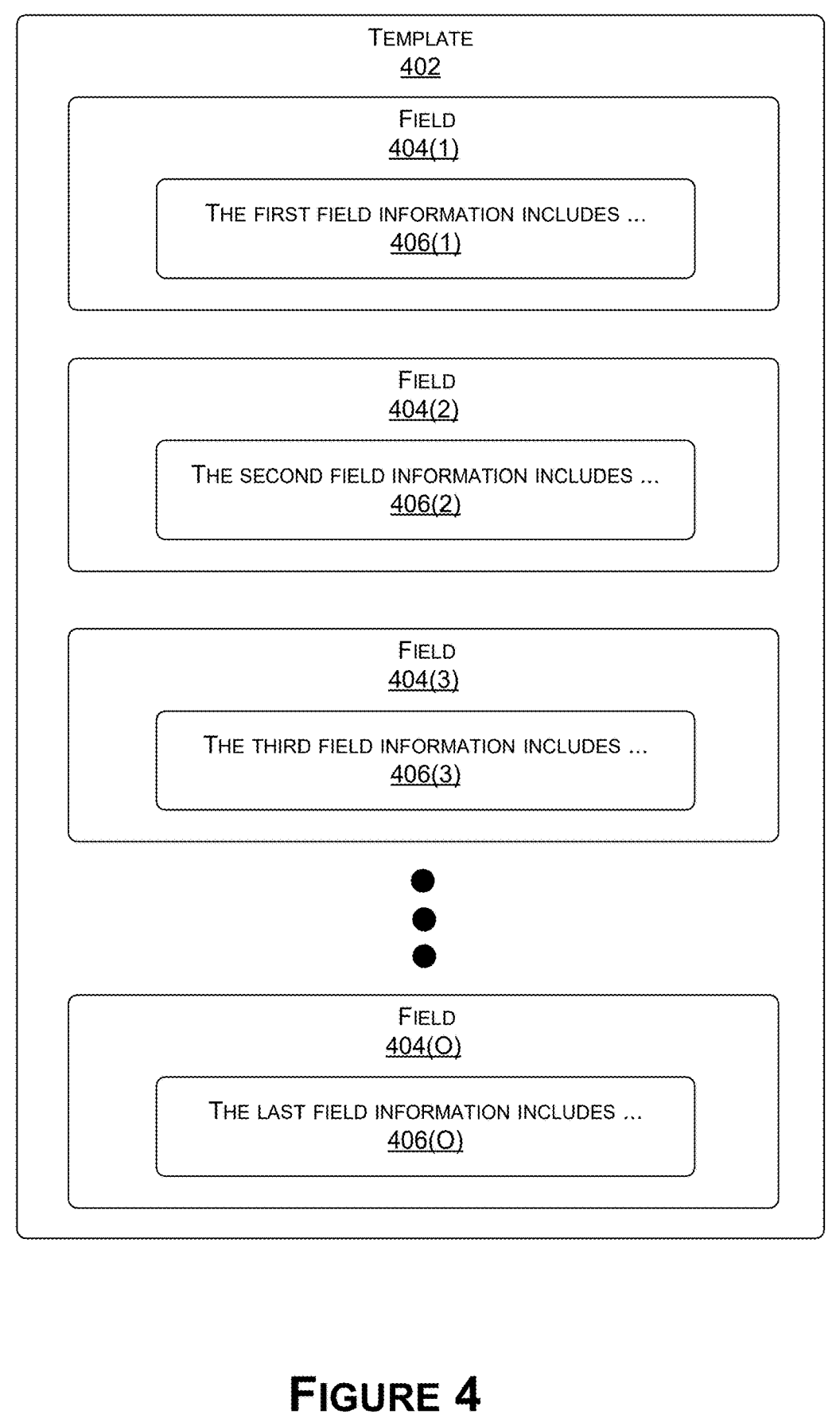

TEMPLATE
402

FIELD
404(1)

THE FIRST FIELD INFORMATION INCLUDES ...
406(1)

FIELD
404(2)

THE SECOND FIELD INFORMATION INCLUDES ...
406(2)

FIELD
404(3)

THE THIRD FIELD INFORMATION INCLUDES ...
406(3)

•
•
•

FIELD
404(O)

THE LAST FIELD INFORMATION INCLUDES ...
406(O)

FIGURE 4

1000

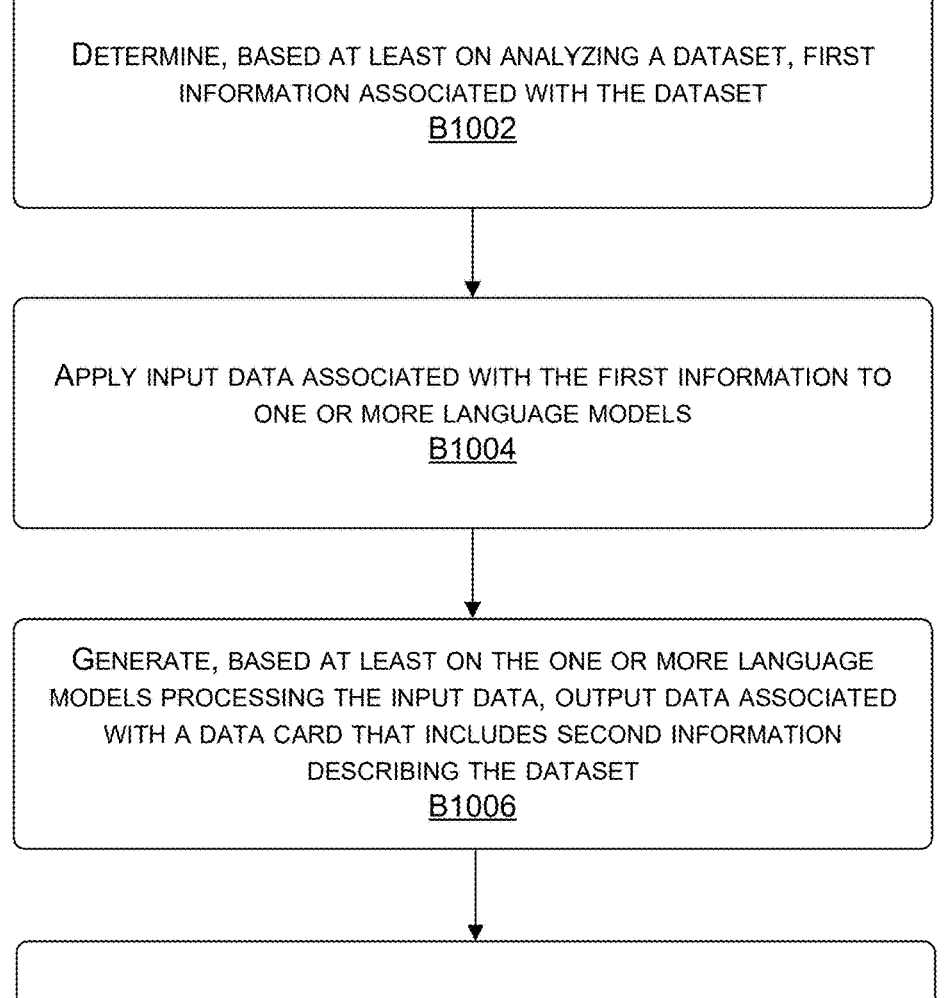

DETERMINE, BASED AT LEAST ON ANALYZING A DATASET, FIRST INFORMATION ASSOCIATED WITH THE DATASET
B1002

APPLY INPUT DATA ASSOCIATED WITH THE FIRST INFORMATION TO ONE OR MORE LANGUAGE MODELS
B1004

GENERATE, BASED AT LEAST ON THE ONE OR MORE LANGUAGE MODELS PROCESSING THE INPUT DATA, OUTPUT DATA ASSOCIATED WITH A DATA CARD THAT INCLUDES SECOND INFORMATION DESCRIBING THE DATASET
B1006

PERFORM ONE OR MORE OPERATIONS USING THE DATA CARD
B1008

DETERMINE THAT A FIRST VERSION OF A DATASET HAS BEEN UPDATED
TO A SECOND VERSION OF THE DATASET
B1102

ANALYZE AT LEAST THE SECOND VERSION OF THE DATASET TO
IDENTIFY FIRST INFORMATION RELATED TO AT LEAST ONE OR MORE
UPDATES THAT OCCURRED TO THE FIRST VERSION OF THE DATASET
B1104

GENERATE, BASED AT LEAST ON ONE OR MORE LANGUAGE MODELS
PROCESSING INPUT DATA ASSOCIATED WITH THE FIRST INFORMATION,
OUTPUT DATA ASSOCIATED WITH A DATA CARD THAT INCLUDES
SECOND INFORMATION DESCRIBING THE SECOND VERSION OF THE
DATASET
B1106

PERFORM ONE OR MORE OPERATIONS USING THE DATA CARD
B1108

FIGURE 11

1200

DETERMINE FEATURE NAMES ASSOCIATED WITH A DATASET
B1202

DETERMINE, BASED AT LEAST ON THE FEATURE NAMES AND ONE OR MORE PROTECTED CLASSES, AT LEAST A PROTECTED FEATURE ASSOCIATED WITH THE DATASET
B1204

DETERMINE ONE OR MORE STATISTICS ASSOCIATED WITH THE PROTECTED FEATURE AS REPRESENTED BY THE DATASET
B1206

DETERMINE, BASED AT LEAST ON THE ONE OR MORE STATISTICS, WHETHER THE PROTECTED FEATURE INCLUDES A SENSITIVE FEATURE
B1208

Figure 14:
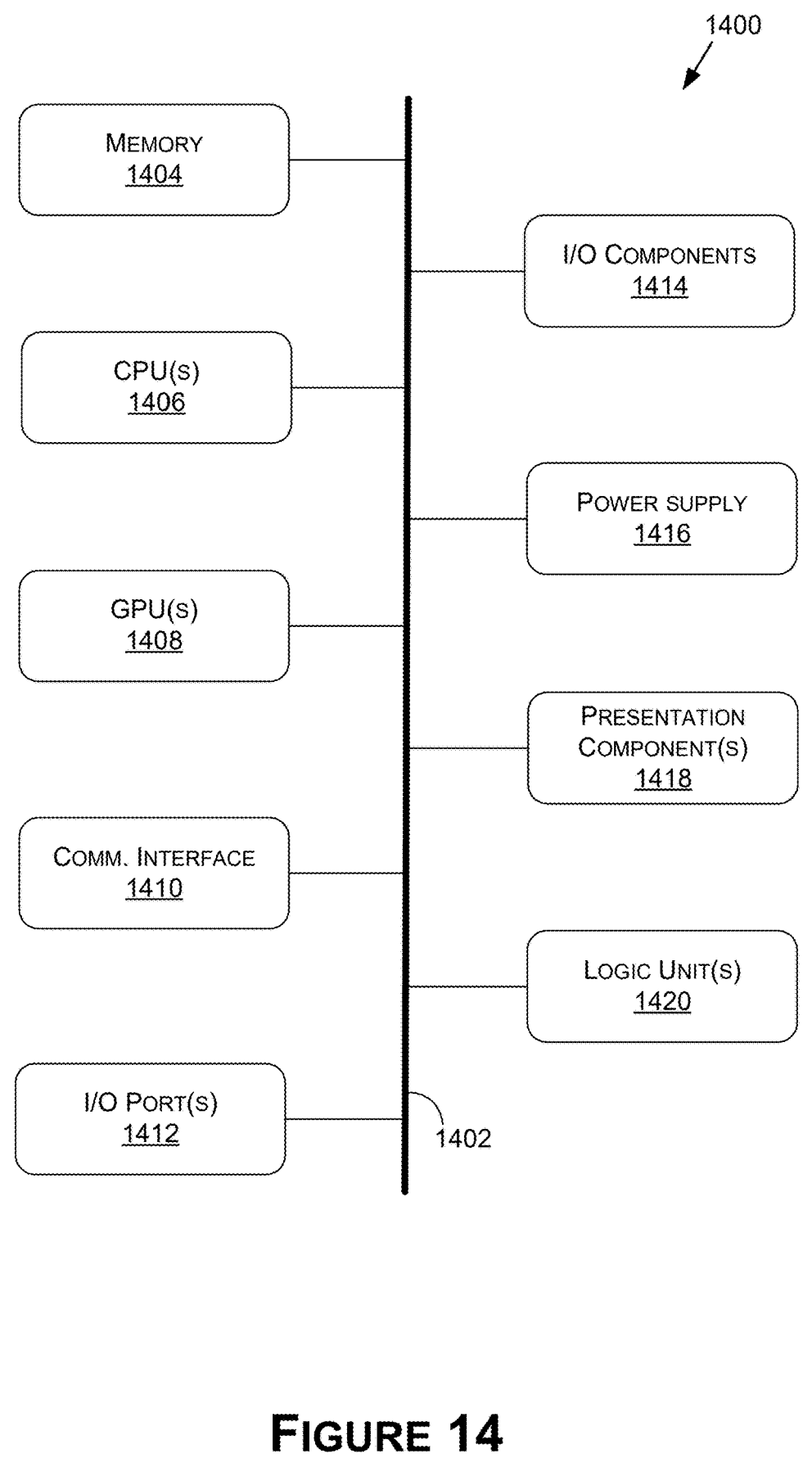

MEMORY
1404

I/O COMPONENTS
1414

CPU(s)
1406

POWER SUPPLY
1416

GPU(s)
1408

PRESENTATION
COMPONENT(S)
1418

COMM. INTERFACE
1410

LOGIC UNIT(S)
1420

I/O PORT(S)
1412

AUTOMATICAL GENERATION AND MAINTENANCE OF DATA CARDS FOR DATASETS

BACKGROUND

Datasets may be used for a wide variety of applications including, but not limited to, training machine learning models to perform one or more processing tasks. As such, various datasets may include different types of data that are specific to the applications of the datasets. For example, a dataset that is being used to train a machine learning model to perform object detection may include images of objects while another dataset that is being used to train a machine learning model to perform speech recognition may include audio clips representing speech. Because of this, data cards may be used to ensure data clarity, transparency, and integrity across datasets and their applications. For example, a data card associated with a dataset may provide information related to the dataset, such as how the data was collected, a size of the dataset, a number of data instances included in the dataset, a number of features included in the dataset, distributions and/or statistics for features, possible sensitive features included in the dataset, and/or so forth.

Conventional systems that generate data cards for datasets have users manually input the information into the data cards, such as by inputting descriptions for each field of the data cards. However, requiring users to input the information requires a large amount of time and computing resources (e.g., user devices), while also causing the data cards to be prone to user error. Additionally, since datasets may be created using different developers, formats of the data cards may be inconsistent across the datasets. For example, some developers generate data cards that include only the highest level of information, such as names of the datasets and links to resources associated with the datasets, while other developers generate data cards that include more exhaustive information, such as dataset features, distributions and/or statistics associated with the features, and possible sensitive features associated with the datasets.

Furthermore, datasets may be updated to improve the datasets for their respective applications. For example, a first version of a dataset may include initial data instances while a second, updated version of the dataset may include new data instances that were added to the dataset for various reasons, such as reduce a possible bias of the dataset. However, in some circumstances, the data cards associated with the datasets may not be updated with the new versions of the datasets. When the data cards are not updated, it may be difficult to maintain the data clarity, transparency, and/or integrity associated with the current versions of the datasets. For example, if a data card does not reflect the current version of the dataset, then developers that use the data card may be unable to determine whether the dataset is adequate to perform specific applications, such as training machine learning models.

SUMMARY

Embodiments of the present disclosure relate to automatic generation and maintenance of data cards for datasets. Systems and methods are disclosed that process a dataset in order to identify relevant information associated with the dataset. For example, the dataset may include and/or be associated with sources of information—such as files, documents, links, memos, research papers, annotations, labels, and/or the like—that describe data instances (e.g., images, audio clips, point clouds, etc.) included in the dataset. These sources of information may then be analyzed to retrieve the relevant information associated with the dataset. Systems and methods are then further disclosed that may use one or more language models to process input data associated with the relevant information in order to generate a data card associated with the dataset. In some examples, the input data processed by the language model(s) may further be associated with additional information, such as a template indicating a format for the data card and/or inputted information from one or more users.

In contrast to conventional systems, such as the conventional systems described above, the systems of the present disclosure, in some embodiments, may use the language model(s) to automatically generate data cards for datasets. As such, and in contrast to the conventional systems, users may not need to manually identify information that is relevant to the data cards and/or input the relevant information when generating data cards, which may save time and/or computing resources. Additionally, in contrast to the conventional systems, the systems of the present disclosure, in some embodiments, may automatically update data cards to represent accurate information related to datasets. For instance, and as described in more detail herein, when a dataset is updated to a new version such as removing data instances from and/or adding new data instances to the dataset, the systems of the present disclosure may automatically update the current data card for the dataset and/or generate a new data card for the dataset. This way, datasets may continuously be associated with data cards ensure data clarity, transparency, and integrity of the datasets and their applications.

BRIEF DESCRIPTION OF THE DRAWINGS

The present systems and methods for techniques for automatic generation and maintenance of data cards for datasets are described in detail below with reference to the attached drawing figures, wherein:

FIG. 4 illustrates an example of a data card template, in accordance with some embodiments of the present disclosure;

FIG. 10 illustrates a flow diagram showing a method for generating a data card associated with a dataset, in accordance with some embodiments of the present disclosure;

FIG. 11 illustrates a flow diagram showing a method for generating a data card associated with an updated version of a dataset, in accordance with some embodiments of the present disclosure;

FIG. 12 illustrates a flow diagram showing a method for identifying a sensitive feature associated with a dataset, in accordance with some embodiments of the present disclosure;

FIG. 14 is a block diagram of an example computing device suitable for use in implementing some embodiments of the present disclosure.

DETAILED DESCRIPTION

Figure 1:
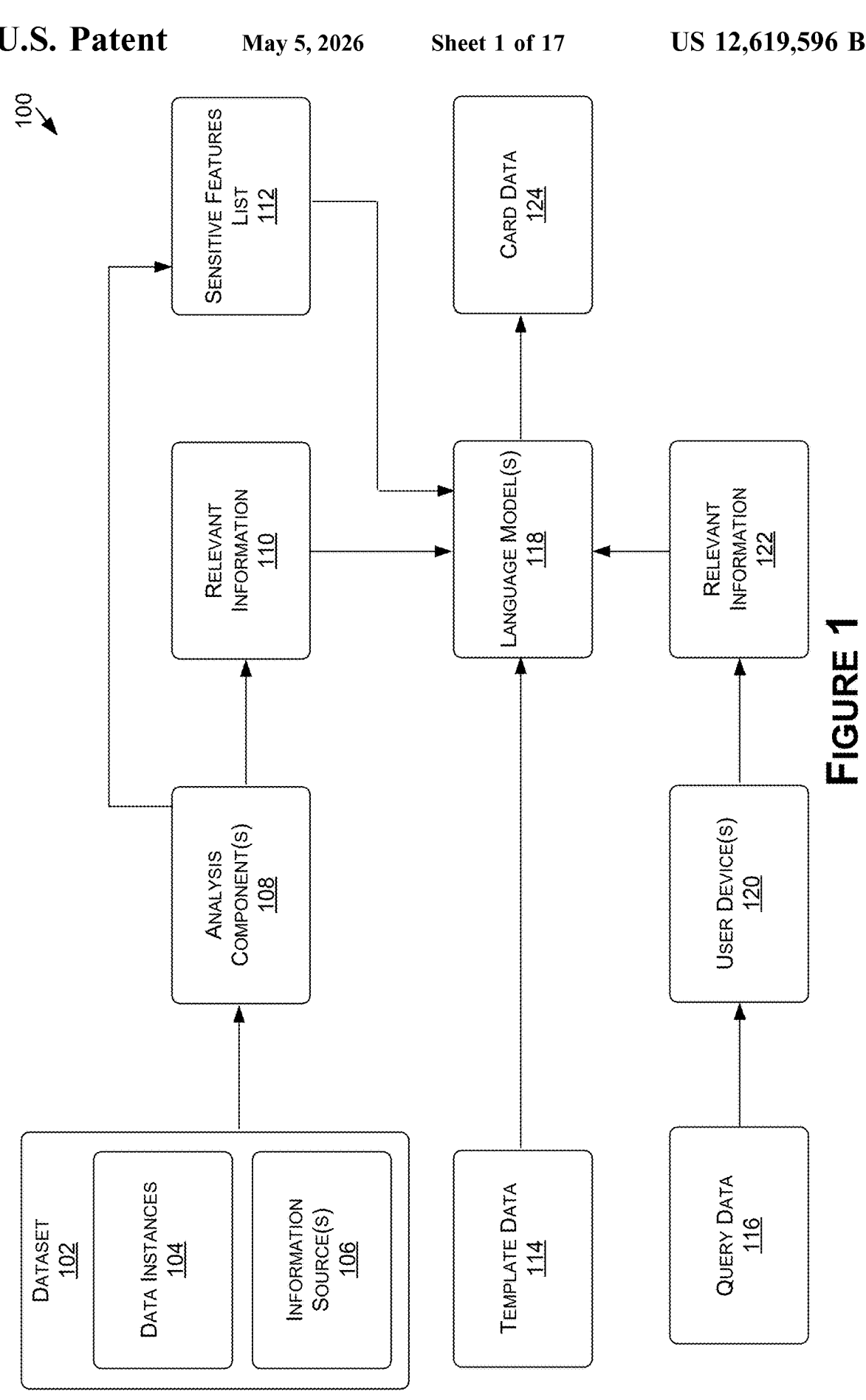
FIG. 1 illustrates an example of a process for generating a data card for a dataset, in accordance with some embodiments of the present disclosure.

Systems and methods are disclosed related to automatic generation and maintenance of data cards for machine learning models. For instance, a system(s) may generate, obtain, receive, retrieve, and/or store a dataset that includes data instances and/or one or more sources of information related to the dataset. As described herein, the data instances may include, but are not limited to, images, videos, audio clips, textual resources, point clouds, spreadsheets, numerical information, tables, and/or any other type of data that may be included in datasets. Additionally, the sources of information may include, but are not limited to, files, documents, links, memos, research papers, manuals, notes, annotations, labels, and/or any other source type that includes information related to the dataset. In some examples, the dataset may be created for a specific application, such as to train machine learning models to perform a task (e.g., object recognition, speech processing, etc.). However, in some examples, the dataset may be created for multiple applications, such as by including various types of data that may be used to train machine learning models to perform different types of tasks.

The system(s) may then perform one or more processes to extract relevant information associated with the dataset that is later used to generate a data card. For example, system(s) may parse through the dataset, such as the sources of information, to identify relevant information describing at least a snapshot of the dataset, statistics for distributions of features, possible sensitive features, access rights for the dataset, dataset versions and modification dates, dataset training, testing, and validation data distributions, annotation characteristics, and/or quality metrics and visualizations. As described herein, the snapshot of the dataset may include, but is not limited to, a size of the dataset, a number of data instances within the dataset, a type of data included in the dataset, a number of fields within the dataset, a number of unique label groups within the dataset, and/or an average number of labels per data instance. Additionally, the statistics of distributions of each feature may include, but are not limited to, a count, a mean, a standard deviation, quantiles, and/or a mode associated with the feature distribution. Furthermore, annotation characteristics may include all unique labels included in the dataset, a count of the labels, an average number of annotations per data instance, and/or metrics measuring granularity of each annotated class.

In some examples, to identify the possible sensitive features, the system(s) may further analyze the dataset, such as the sources of information, using one or more metrics. For instance, the system(s) may obtain data representing protected classes as classified by county law, city law, state law, country law, and/or any other law. As described herein, a protected class may include, but is not limited to, race, ethnicity, religion, sex, age, gender, gender identity, gender expression, marital status, medical condition, disability, military status, and/or any other type of protected class. The system(s) may then determine whether one or more feature names as determined using the sources of information (e.g., the annotations) is related to the protected classes.

For instance, and for a feature name, the system(s) may compute text similarities between the feature name and the protected classes and use the text similarities to determine whether the feature name is associated with a protected class. As described herein, the system(s) may perform any technique to compute the text similarities. For example, the system(s) may use one or more encoders to generate an embedding for the feature name and embeddings for the protected classes. The system(s) may then compute similarity scores associated with the feature name using the embeddings, such as by using a dot product on the embeddings. Additionally, the system(s) may then use the highest similarity score to determine whether the feature name is associated with a protected class. For example, the system(s) may determine that the feature name is associated with a protected class and thus a protected feature when the similarity score satisfies (e.g., is equal to or greater than) a threshold score or determine that the feature name is not associated with the protected class and thus not a protected feature when the similarity score does not satisfy (e.g., is less than) the threshold score.

The system(s) may then use the statistics and distributions associated with the protected features to determine whether the protected features include sensitive features (e.g., whether there is possible bias associated with the protected features). For instance, and for a protected feature, the system(s) may use the statistics to determine counts associated with categories corresponding to the protected feature and then use the counts to determine a variance associated with the protected feature. The system(s) may then determine a variance ratio associated with the protected feature, such as by dividing the lowest variance value by the highest variance value. Additionally, the system(s) may determine whether the protected feature includes a sensitive feature using the variance ratio. For example, the system(s) may determine that the protected feature includes a sensitive feature (e.g., there is possible bias) when the variance ratio does not satisfy (e.g., is less than) a threshold value or determine that the protected feature does not include a sensitive feature (e.g., there is no bias) when the variance ratio satisfies (e.g., is equal to or greater than) the threshold value. In some examples, if the system(s) determines that the protected feature includes a sensitive feature, the system(s) may add the sensitive feature to a list.

In some examples, the system(s) may obtain additional information that is relevant for generating the data card for the dataset. For example, the system(s) may obtain data representing a template for data cards, where the template represents at least a format associated with organizing information describing datasets. For instance, the template may indicate at least fields to include in the data cards, an organization associated with the fields (e.g., an order of the fields within the data cards), types of information to include in the fields, and/or any other instructions for generating data cards.

For another example, the system(s) may provide a document to one or more users, where the document includes at least queries (e.g., questions) related to additional relevant information that may be needed to generate the data card. For example, the queries may be associated with retrieving relevant information for an identifier (e.g., a name) of the dataset, one or more data sources for the dataset (e.g., data origins, relevant licenses, data preparation techniques, etc.), provisioning of the dataset (e.g., data storage hardware, data speed, data lineage, accessibility requirements, scope of intended use, etc.), data sanitization (e.g., data processing tools, data enrichment techniques, etc.), data optimization, data decommissioning strategy, and/or any other relevant information. Based at least on providing the document, the system(s) may then receive inputs representing at least a portion of the relevant information as requested by the document.

The system(s) may then generate input data associated with the relevant information retrieved from processing the dataset, the template, the relevant information received from the user(s), and/or a prompt associated with generating data cards. Additionally, the system(s) may apply the input data to one or more language models that process the input data and, based at least on the processing, generate and/or output data associated with the data card for the dataset. As described herein, the language model(s) may perform any type of processing to generate the data card, such as processing that is described with respect to FIGS. 13A-13C. The system(s) may then perform one or more processes using the data card, such as storing the data card in association with the dataset (e.g., stored in a digital format that is accessible for integration with machine learning workflows or pipelines), providing a user interface (e.g., graphical user interface) that allows users to view and interact with the data card, integrating the data card with machine learning workflows or pipelines (e.g., to provide ongoing insights into data quality and bias during model development and deployment), providing the data card for use in model development, adjusting model parameters and weights based on insights provided by the data card, applying the data card to the same or different language model(s) to generate model cards (which can be used as guardrails to ensure models operate within safe, ethical, and/or intended boundaries), providing the data card to users that may use the dataset to perform applications, and/or any other operation.

In some examples, the system(s) may perform additional processes with respect to the dataset and/or the data card when the dataset is updated to a new version. As described herein, the dataset may be updated to a new version by at least removing one or more data instances from the dataset, adding one or more data instances to the dataset, updating one or more sources of information associated with the dataset, and/or performing any other type of update to the dataset. For instance, the system(s) may initially verify an integrity associated with the data included in the new version of the dataset by checking that one or more (e.g., all) data instances exist and are accessible with respect to the new version of the dataset. In some examples, and for a data instance, the system(s) may perform the checking by determining whether the data instance is retrievable from the new version of the dataset, determining whether the data instance is available using a corresponding link from the new version of the dataset, and/or performing any other technique. In some examples, the system(s) may then remove data instances and/or information (e.g., links) associated with data instances that are no longer available.

The system(s) may then analyze the new version dataset, such as the sources of information (e.g., the annotations, etc.) associated with the new version dataset, and/or the current data card to determine whether any new classes and/or features have been added to the new version of the dataset. In some examples, if the system(s) determines that one or more new classes and/or features were added to the new version of the dataset, then the system(s) may perform one or more of the processes described herein to generate a new data card for the new version of the dataset. This may be because the system(s) needs to perform at least the sensitivity processing to determine whether any new biases were created with respect to the new version of the dataset. Additionally, in some examples, if the system(s) determines that no new classes and/or features were added to the new version of the dataset, then the system(s) may perform one or more of the processes described herein to generate a partial data card to add to the current data card. For example, the partial data card may include information describing the updates that occurred to the new version of the dataset.

In some examples, the data card may be used to perform one or more processes. For a first example, the data card may be used to identify bias associated with one or more classes and/or features as represented by the data included in the dataset such that the dataset may be updated to remove the bias. For instance, the system(s) may retrieve additional data instances to add to the dataset, where the additional data instances are added to remove the bias associated with the dataset. For a second example, the data card may be used with respect to other technologies, such as other systems that train machine learning models to perform various tasks. For instance, if an additional system is training a machine learning model to perform a specific task, such as object segmentation, then the additional system may receive data cards associated with various datasets. The additional system may then use the data cards to identify at least one dataset that includes the data needed to train the machine learning model to perform the task and retrieve the dataset(s) from the system(s).

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems implementing one or more vision language models (VLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example of a process 100 for generating a data card for a dataset, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include generating, obtaining, receiving, retrieving, and/or storing a dataset 102 that includes data instances 104 and/or one or more sources of information 106 related to the dataset 102. As described herein, the data instances 104 may include, but are not limited to, images, videos, audio clips, textual resources, point clouds, spreadsheets, numerical information, tables, and/or any other type of data that may be included in datasets. Additionally, the sources of information 106 may include, but are not limited to, files, documents, links, memos, research papers, manuals, notes, annotations, labels, and/or any other source type that includes information related to the dataset 102. In some examples, the dataset 102 may be created for a specific application, such as to train machine learning models to perform a task (e.g., object recognition, speech processing, etc.). However, in some examples, the dataset 102 may be created for multiple applications, such as by including various types of data that may be used to train machine learning models to perform different types of tasks.

The process 100 may then include one or more analysis component 108 processing the dataset 102 in order to identify relevant information 110 for generating a data card for the dataset 102. For instance, the analysis component(s) 108 may parse through the dataset 102, such as the sources of information 106, to identify the relevant information 110 for including in the data card. As described herein, the relevant information 110 may include, but is not limited to, a snapshot of the dataset 102, statistics for distributions of features included in the dataset 102, possible sensitive features, access rights for the dataset 102, dataset versions and modification dates, dataset training, testing, and validation data distributions, annotation characteristics, quality metrics and visualizations, and/or any other information that describes the dataset 102. The snapshot of the dataset 102 may include, but is not limited to, a size of the dataset 102, a number of data instances within the dataset 102, a type of data included in the dataset 102, a number of fields within the dataset 102, a number of unique label groups within the dataset 102, and/or an average number of labels per data instance. Additionally, the statistics of distributions of each feature may include, but are not limited to, a count, a mean, a standard deviation, quantiles, and/or a mode associated with the feature distribution. Furthermore, annotation characteristics may include all unique labels included in the dataset 102, a count of the labels, an average number of annotations per data instance, and/or metrics measuring granularity of each annotated class.

Figure 2:
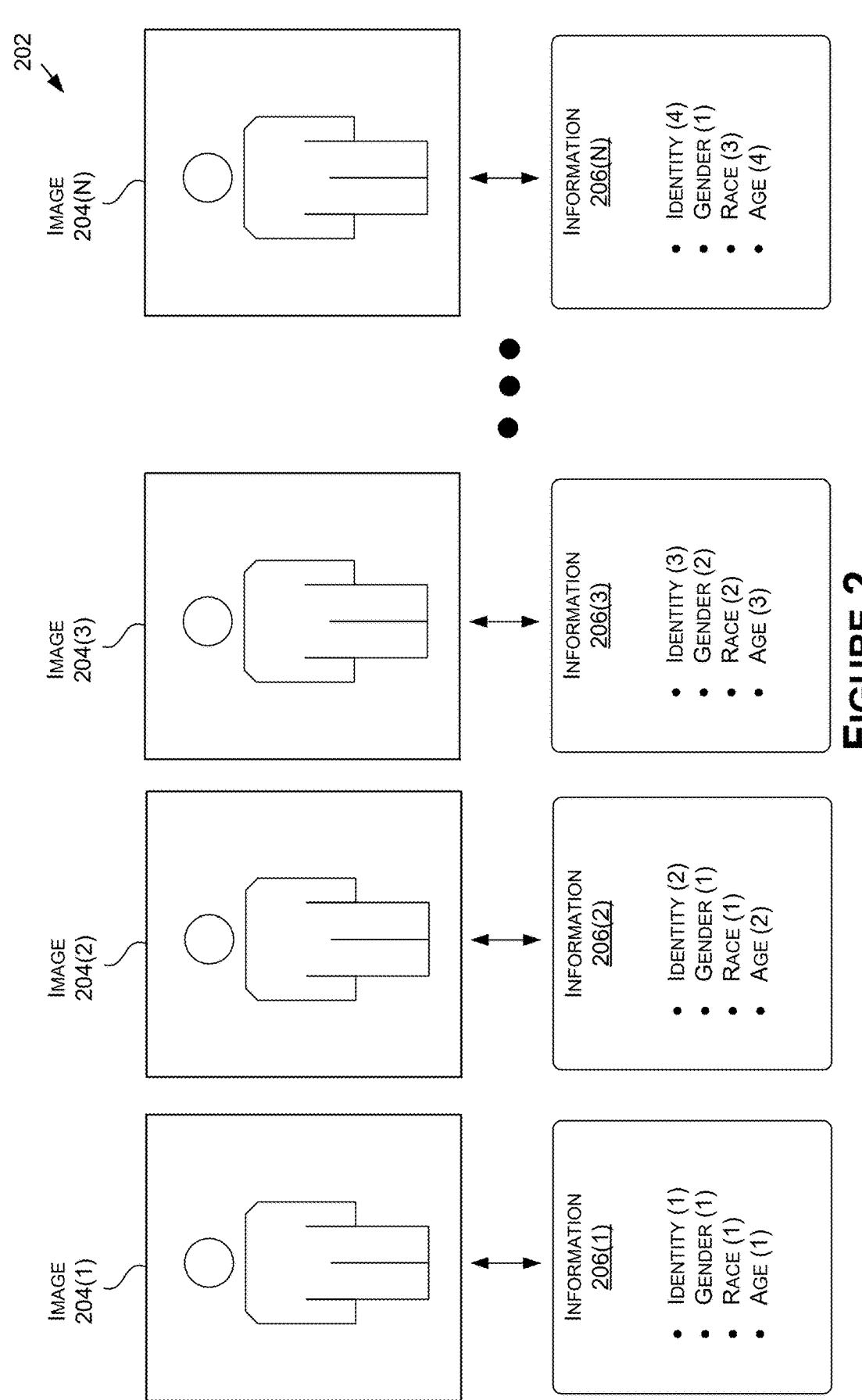
FIG. 2 illustrates an example of a dataset that may be processed to extract relevant information, in accordance with some embodiments of the present disclosure.

For instance, FIG. 2 illustrates an example of a dataset 202 (which may represent, and/or be similar to, the dataset 102) that may be processed to extract relevant information, in accordance with some embodiments of the present disclosure. As shown, the data instances included in the dataset 202 may include images 204(1)-(N) (also referred to singularly as "image 204" or in plural as "images 204") of people. For example, the dataset 202 may be used to train one or more machine learning models to perform object or face detection The images 204 may also be associated with sources of information 206(1)-(N) (also referred to as "information 206") that include labels (e.g., annotations) describing the people represented by the images 204. For instance, and as shown, the labels may be associated with features that include identities of the people, genders of the people, races of the people, and ages of the people.

As such, the analysis component(s) 108 may process the information 206 in order to extract relevant information for including in a data card associated with the dataset 202. For example, the analysis component(s) 108 may determine at least a data type includes images 204, a number of images 204 included in the dataset 202, that there is an average of four labels per image 204, and that the features include identity, gender, race, and age. Additionally, within the features, the analysis component(s) 108 may identify relevant information associated with different categories. For example, and for the age feature, the analysis component(s) 108 may determine the count, the mean, the standard deviation, the quantiles, and/or the mode associated with "Gender (1)" and also the count, the mean, the standard deviation, the quantiles, and/or the mode associated with "Gender (2)." The analysis component(s) 108 may then perform similar processes for one or more additional categories (e.g., each category) associated with one or more additional features (e.g., each feature).

Referring back to the example of FIG. 1, the process 100 may further include the analysis component(s) 108 processing the dataset 102 in order to identify sensitive features. For instance, in some examples, the analysis component(s) 108 may initially identify protected features that are associated with a protected class such as, but not limited to, race, ethnicity, religion, sex, age, gender, gender identity, gender expression, marital status, medical condition, disability, military status, and/or any other type of protected class. Based at least on detecting a protected feature, the analysis component(s) 108 may then perform an additional analysis to determine whether the protected feature includes a sensitive feature. As described herein, in some examples, the analysis component(s) 108 may determine that the potential feature includes a sensitive feature based at least on one or more categories associated with the sensitive feature being underrepresented within the dataset 102, such that there may be possible bias. The analysis component(s) 108 may then generate and/or output data representing a sensitive features list 112 that includes at least one or more (e.g., each) of the sensitive features identified by the analysis component(s) 108.

Figure 3:
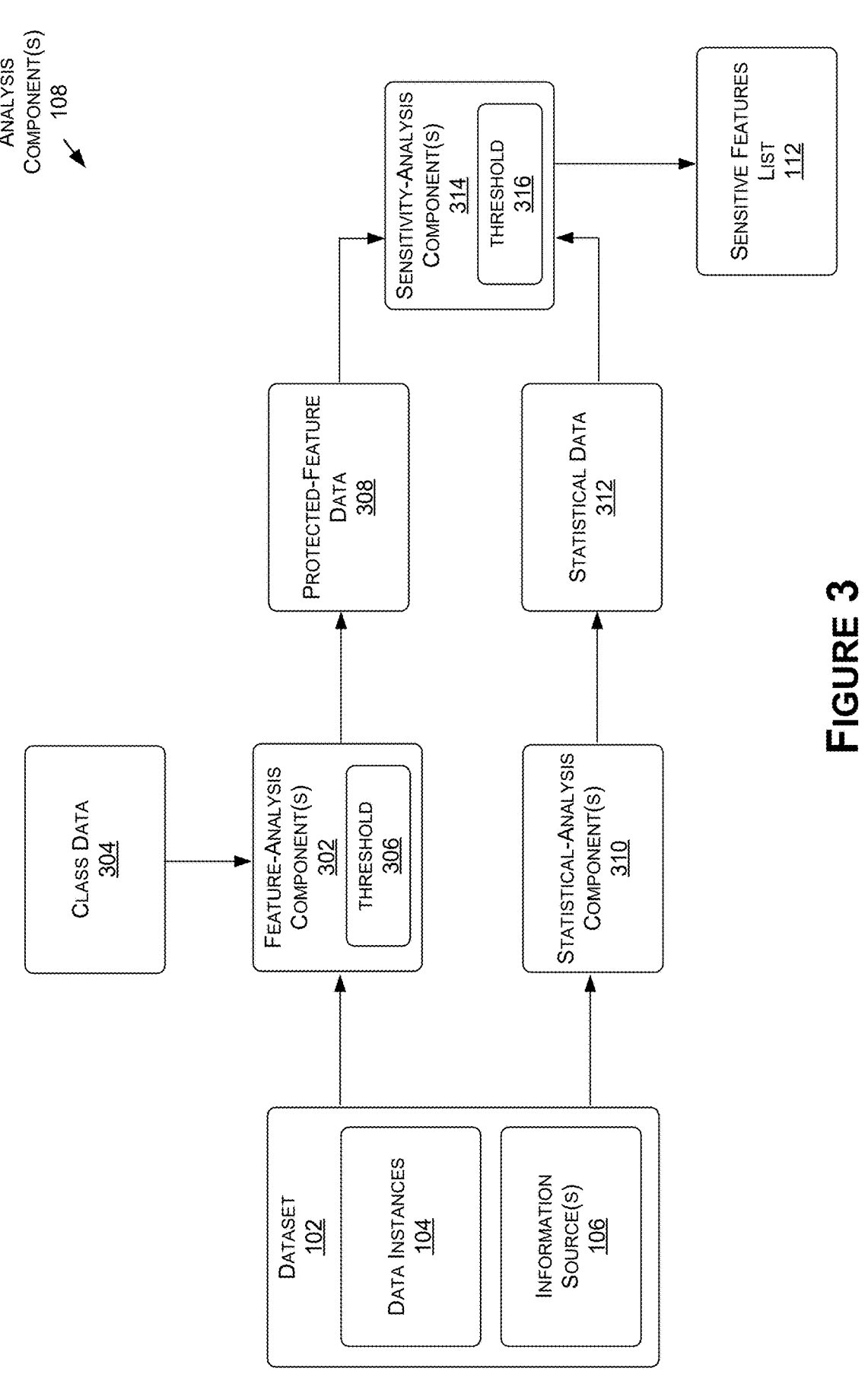
FIG. 3 illustrates an example of processing a dataset in order to identify sensitive features associated with a dataset, in accordance with some embodiments of the present disclosure.

For more details, FIG. 3 illustrates an example of processing the dataset 102 in order to identify sensitive features associated with the dataset 102, in accordance with some embodiments of the present disclosure. As shown, the analysis component(s) 108 may include one or more feature-analysis components 302 that process the dataset 102 (e.g., the sources of information 106) along with class data 304 representing protected classes. Based at least on the processing, the feature-analysis component(s) 302 may determine whether one or more feature names as determined using the sources of information 106 (e.g., the annotations) is related to the protected classes.

For instance, and for a feature name, the feature-analysis component(s) 302 may compute text similarities between the feature name and names included in the protected classes and use the text similarities to determine whether the feature name is associated with a protected class. As described herein, the feature-analysis component(s) 302 may perform any technique to compute the text similarities. For example, the feature-analysis component(s) 302 may use one or more encoders to generate an embedding associated with the feature name and embeddings associated with the names included in the protected classes. The feature-analysis component(s) 302 may then compute similarity scores associated with the feature name using the embeddings, such as by using a dot product on the embeddings (and/or using any other type of mathematical equation). Additionally, the feature-analysis component(s) 302 may then use the highest similarity score to determine whether the feature name is associated with a protected class. For example, the feature-analysis component(s) 302 may determine that the feature name is associated with a protected class when the similarity score satisfies (e.g., is equal to or greater than) a threshold score 306 or determine that the feature name is not associated with the protected class when the similarity score does not satisfy (e.g., is less than) the threshold score 306.

As described herein, the feature-analysis component(s) 302 may then determine that the feature includes a protected feature when the feature name is similar to a protected class, or the feature-analysis component(s) 302 may determine that the feature does not include a protected feature when the feature name is not similar to a protected class. Additionally, the feature-analysis component(s) 302 may then continue to perform similar processes to determine whether one or more additional features (e.g., each additional feature) associated with the dataset 102 includes one or more additional protected features. The feature-analysis component(s) 302 may generate and/or output protected-feature data 308 representing the identified protected features from the dataset 102.

As further shown by the example of FIG. 3, the analysis component(s) 108 may include one or more statistical-analysis components 310 that process the dataset 102 in order to determine statistical information associated with the features (e.g., the protected features and/or all of the features). As described herein, in some examples, the statistical information associated with a feature may include at least a variance associated with the feature, an entropy associated with the feature, an impurity associated with the feature, and/or any other statistic and/or distribution. In some examples, the statistical-analysis component(s) 310 may perform any technique to determine the variance, such as based on an expected value of a squared deviation from a mean of the feature. As shown, the statistical-analysis component(s) 310 may then generate and/or output statistical data 312 representing at least the statistics associated with the features.

For an example, and referring back to the example of FIG. 2, the statistical-analysis component(s) 310 may analyze the dataset 202 to determine that, with regard to the gender feature, there are 51,778 images 204 that represent Gender (1) and 45,920 images 204 that represent Gender (2). As such, the statistical-analysis component(s) 310 may determine that a feature entropy for the gender feature includes 0.6193 and a feature impurity for the gender feature includes 0.4982. Additionally, the statistical-analysis component(s) 310 may analyze the dataset 202 to determine that, with regard to the age feature, there are 18,612 images 204 that represent Age (1), 14,990 images 204 that represent Age (2), 13,837 images 204 that represent Age (3), 13,835 images 204 that represent Age (4), 13,798 images 204 that represent Age (5), 12,210 images 204 that represent Age (6), and 10,425 images 204 that represent Age (7). As such, the statistical-analysis component(s) 310 may determine that a feature entropy for the age feature include 1.9321 and a feature impurity for the age feature includes 0.8531.

Referring back to the example of FIG. 3, the analysis component(s) 108 may further include one or more sensitivity-analysis components 314 that are configured to determine whether protected features include sensitive features using at least the protected-feature data 308 and the statistical data 312. As described herein, in some examples, the sensitivity-analysis component(s) 314 may determine that a protected feature includes a sensitive feature based at least on one or more categories associated with the protected feature being underrepresented. For example, the sensitivity-analysis component(s) 314 may determine that a protected features includes a sensitive feature when there is potential bias associated with the protected feature.

As such, the sensitivity-analysis component(s) 314 may use one or more techniques to determine whether one or more categories are underrepresented. For example, and for a protected feature, the sensitivity-analysis component(s) 314 may determine a ratio associated with the protected feature using the lowest variance value associated with the protected feature and the highest variance value associated with the protected feature. In some examples, the sensitivity-analysis component(s) 314 may determine the ratio by dividing the lowest variance value by the highest variance value. The sensitivity-analysis component(s) 314 may then determine that the protected feature includes a sensitive feature based at least on the ratio not satisfying (e.g., being less than) a threshold value 316 or determine that the protected feature does not include a sensitive feature based at least on the ratio satisfying (e.g., being equal to or greater than) the threshold 316.

The sensitivity-analysis component(s) 314 may then continue to perform this analysis for one or more additional protected features (e.g., each protected feature) associated with the dataset 102. Additionally, the sensitivity-analysis component(s) 314 may generate and/or output the sensitive features list 112 that represents the sensitive features associated with the dataset 102.

For another example technique for how to identify sensitive features, and referring back to the example of FIG. 2, the feature-analysis component(s) 302 may determine that the gender feature includes a protected feature based at least a feature name associated with the gender feature being similar to a protected class. Additionally, the feature-analysis component(s) 302 may determine that the age feature includes a protected feature based at least on a feature name associated with the age feature being similar to a protected class. The sensitivity-analysis component(s) 314 may then determine that the gender feature does not include a sensitive feature based at least on the feature impurity of 0.4982 being less than or equal to a threshold value (e.g., 0.5). However, the sensitivity-analysis component(s) 314 may determine that the age feature includes a sensitive feature based at least on the feature impurity of 0.8531 being greater than the threshold value.

Referring back to the example of FIG. 1, the process 100 may include generating obtaining, receiving, retrieving, and/or storing template data 114 representing a template for generating data cards. As described herein, the template may represent at least a layout associated with the data cards, such as fields to include within the data cards and/or an order for the fields within the data cards. For example, the layout may indicate an order for fields that includes the snapshot of the dataset 102, the statistics for distributions of features included in the dataset 102, the possible sensitive features, the access rights for the dataset 102, the dataset versions and modification dates, the dataset training, testing, and validation data distributions, annotation characteristics, and/or the quality metrics and visualizations.

For instance, FIG. 4 illustrates an example of a data card template 402, in accordance with some embodiments of the present disclosure. As shown, the template 402 may include at least fields 404(1)-(O) (also referred to singularly as "field 404" or in plural as "fields 404") for inputting various types of relevant information for the data card. For example, the first field 404(1) may be for inputting information related to the snapshot of the database, the second field 404(2) may be for inputting information related to the statistics and/or distribution of features, the third field 404(3) may be for inputting information related to the sensitive features, and/or so forth. Additionally, in some examples, the template 402 may include prompts 406(1)-(O) that help one or more language models input the correct information into the fields 404, which is described in more detail herein. While this is just one example of a template 402 that may be used to generate data cards associated with datasets, in other examples, any other template and/or layout may be used to generate the data cards.

Referring back to the example of FIG. 1, the process 100 may also include generating, obtaining, receiving, retrieving, and/or storing query data 116 representing one or more queries for additional relevant information related to the data card. For instance, the queries may be associated with retrieving relevant information for an identifier (e.g., a name) of the dataset 102, one or more data sources for the dataset 102 (e.g., data origins, relevant licenses, data preparation techniques, etc.), provisioning of the dataset 102 (e.g., data storage hardware, data speed, data lineage, accessibility requirements, scope of intended use, etc.), data sanitization (e.g., data processing tools, data enrichment techniques, etc.), data optimization, data decommissioning strategy, and/or any other relevant information associated with the dataset 102. In some examples, the query data 116 may represent a template document (e.g., form) that is provided when generating all data cards, such that the document represents the same queries. In some examples, the query data 116 may be specific to the dataset 102.

For example, one or more language models 118 may process at least the relevant information 110 and/or the sensitive features list 112 with respect to the template represented by the template data 114. Based at least on the processing, the language model(s) 118 may determine that the relevant information 110 and/or the sensitive features list 112 is missing relevant information that may be included in the data card. For instance, the language model(s) 118 may determine that the relevant information 110 and/or the sensitive features list 112 does not include information related to one or more fields from the template. As such, the language model(s) 118 may automatically generate and/or output at least a portion of the query data 116 that represents one or more queries for retrieving the missing information.

The process 100 may then include providing the queries represented by the query data 116 to one or more users (e.g., one or more developers of the dataset 102). For instance, and in the example of FIG. 1, the queries may be provided to the user(s) based at least on sending, to one or more user device 120, the query data 116 such that the user device(s) 120 is able to present the queries to the user(s). Additionally, while presenting queries, the user device(s) 120 may receive one or more inputs representing the relevant information associated with the queries. For example, if a query requests a name of the dataset 102, then the input(s) may represent the name as specified by the user(s). As shown, the process 100 may then include the user device(s) 120 generating and/or outputting additional relevant information 122 associated with the queries.

Figure 5:
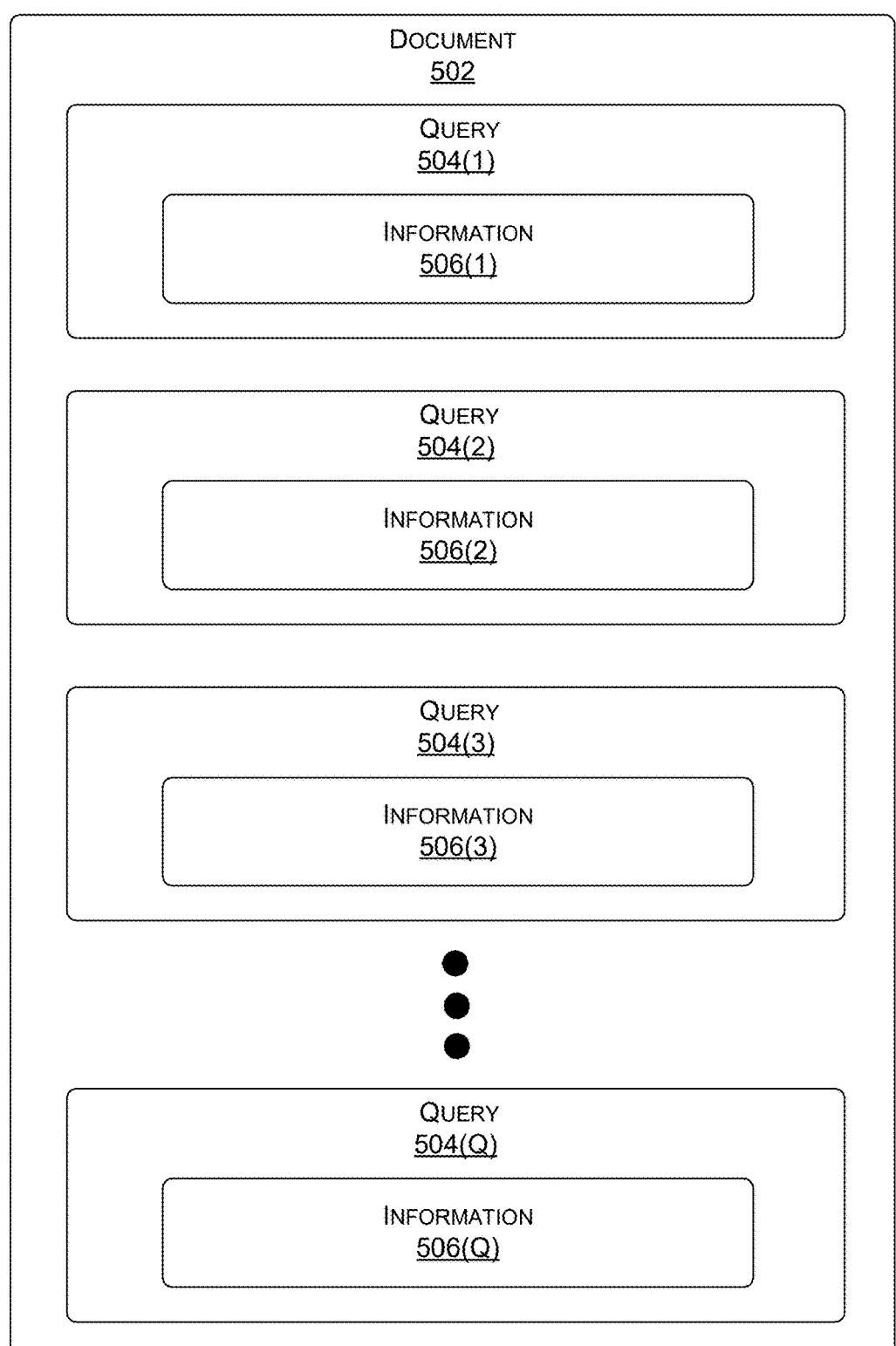
FIG. 5 illustrates an example of a document that includes queries associated with generating a data card, in accordance with some embodiments of the present disclosure.

For more details, FIG. 5 illustrates an example of a document 502 that includes queries associated with generating a data card, in accordance with some embodiments of the present disclosure. As shown, the document 502 may include a number of queries 504(1)-(Q) (also referred to singularly as "query 504" or in plural as "queries 504"). For example, the first query 504(1) may include a question about naming the dataset, the second query 504(2) may include a question about sources for where the data included the dataset was retrieved, the third query 504(3) may include a question about how the dataset is provisioned, and/or so forth. The document 502 also includes information 506(1)-(Q) (also referred to as "information 506") that is relevant to the queries 504. For example, the first information 506(1) may include the name of the dataset, the second information 506(2) may include the sources of where the data was received, the third information 506(3) may include how the dataset is provisioned (e.g., the data storage hardware, the data speed, etc.), and/or so forth.

Referring back to the example of FIG. 1, the process 100 may include applying input data associated with the relevant information 110, the template represented by the template data 114, and/or the relevant information 122 to the language model(s) 118. In some examples, and as described in more detail herein, the relevant information 110, the template, and/or the relevant information 122 may be preprocessed before applying to the language model(s) 118. For example, the relevant information 110, the template, and/or the relevant information 122 may be preprocessed to generate tokens that are then input into the language model(s) 118. Additionally, in some examples, additional data may be applied to the language model(s) 118, such as data representing a prompt to generate the data card for the dataset 102.

The process 100 may then include the language model(s) 118 processing the input data in order to generate card data 124 representing the data card associated with the dataset 102. As described herein, the language model(s) 118 may perform any type of processing to generate the card data 124 using the input data, such as those described with respect to FIGS. 13A-13C. Additionally, in some examples, the data card may include a similar format as represented by the template, but with the relevant information input into the various fields. The process 100 may then include storing the data card in association with the dataset 102. This way, one or more potential users of the dataset 102 may use the data card to determine whether the dataset 102 may be used to perform one or more applications.

Figure 6:
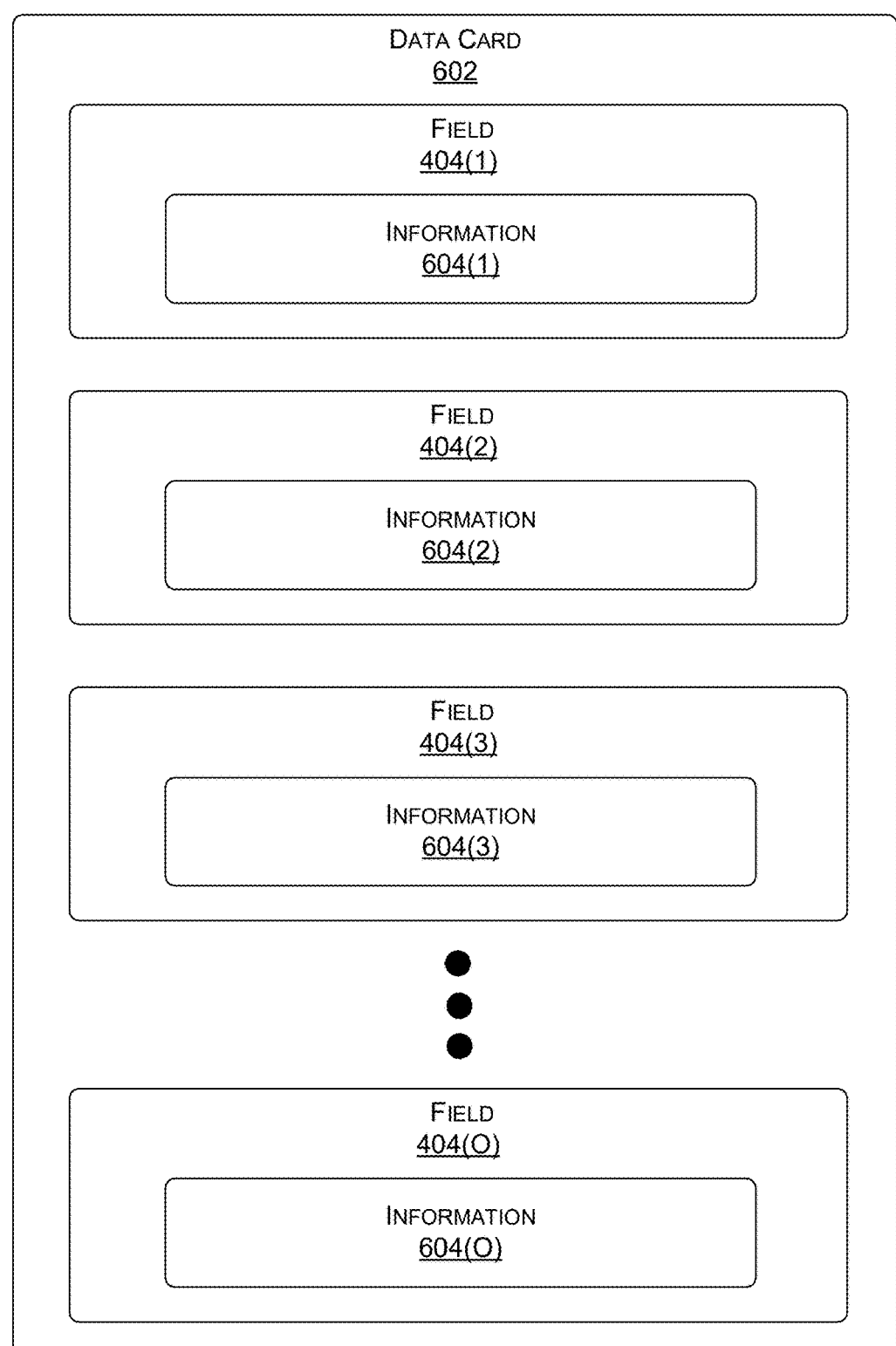
FIG. 6 illustrates an example of a data card that includes relevant information associated with a dataset, in accordance with some embodiments of the present disclosure.

For instance, FIG. 6 illustrates an example of a data card 602 that includes relevant information associated with a dataset, in accordance with some embodiments of the present disclosure. As shown, the data card 602 may include the same fields 404 as the template 402 since the language model(s) 118 generated the data card 602 using the template. However, the data card 602 now includes information 604 (1)-(O) associated with the fields 404. For example, the first information 604(1) may be relevant to the first field 404(1), the second information 604(2) may be relevant to the second field 404(2), the third information 604(3) may be relevant to the third field 404(3), and/or so forth until the final information 604(O) is relevant to the final field 404(O). In some examples, at least a portion of the information 604(1)-(O) may come from the dataset itself, such as from sources of information associated with the dataset. Additionally, or alternatively, in some examples, at least a portion of the information 604(1)-(O) may come from one or more users that answers queries associated with the dataset.

Figure 7:
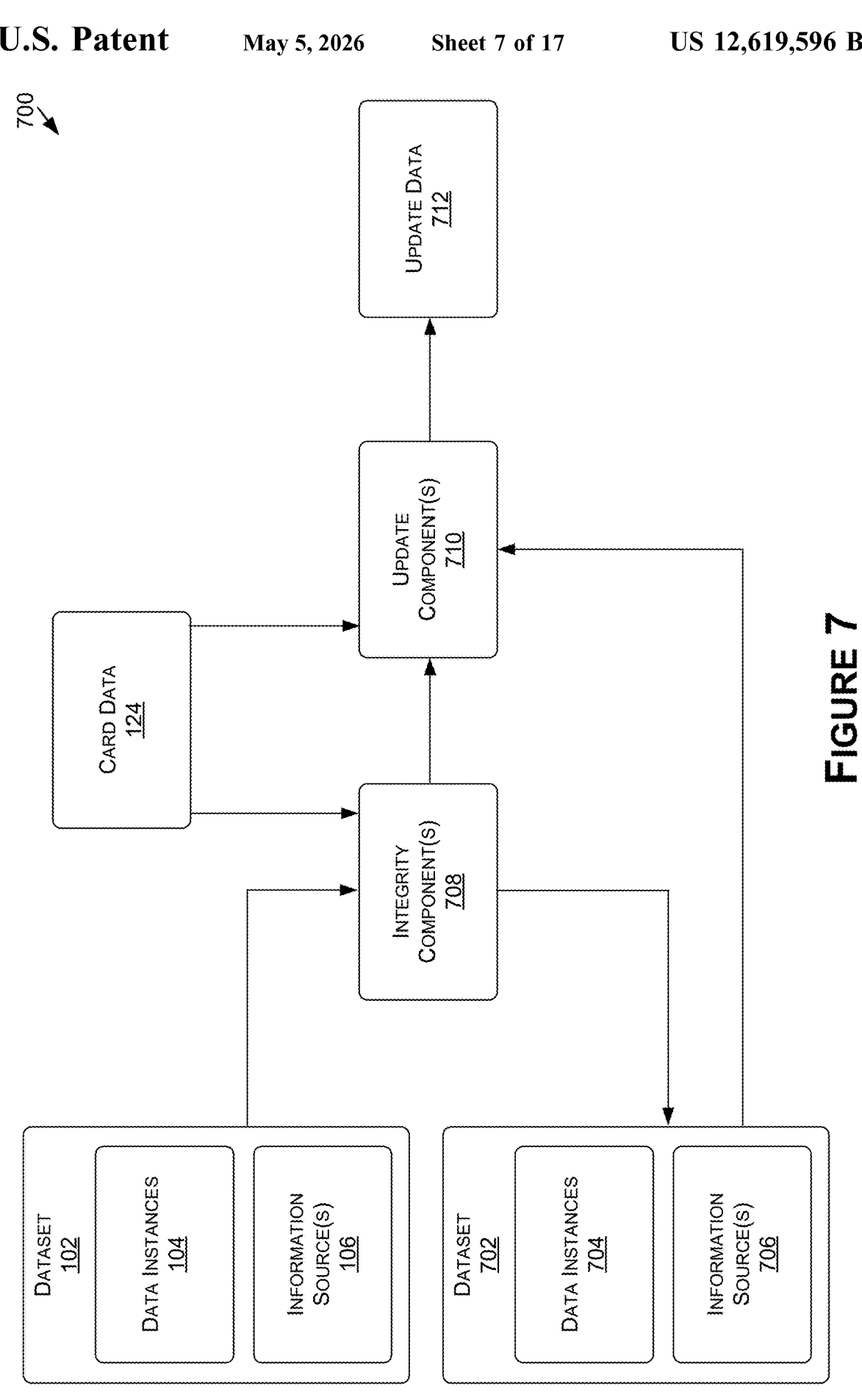
FIG. 7 illustrates an example of a process for updating a data card to reflect a new version of a dataset, in accordance with some embodiments of the present disclosure.

As described herein, the dataset 102 may be updated after generating the data card, such as from a current version of the dataset 102 to a new version of the dataset 102. For example, the dataset 102 may be updated by removing one or more data instances 104, adding one or more data instances 104, removing one or more sources of information 106, adding one or more sources of information 106, and/or by performing any other type of update. When the dataset 102 is updated, it may also be important to update the data card associated with the dataset 102 and/or generate a new data card associated with the dataset 102 in order to ensure that the data card accurately reflects the data included in the dataset 102. As such, FIG. 7 illustrates an example of a process 700 for updating a data card to reflect a new version of the dataset 102, in accordance with some embodiments of the present disclosure.

As shown, the current version of the dataset 102 may be updated to a new version of a dataset 702 such as by updating the data instances 104 associated with the dataset 102 to include data instances 704 and/or updating the sources of information 106 associated with the dataset 102 to include sources of information 706. For a first example, one or more new data instances 704 may have been added to the dataset 702 along with one or more new sources of information 706 that describe the new data instance(s) 704. For instance, the new data instance(s) 704 may have been added to the dataset 702 in order to remove a bias associated with the dataset 702. For a second example, one or more data instances 104 may have been removed from the dataset 702 along with one or more sources of information 106 that describe the removed data instance(s) 104.

As such, the process 700 may include one or more integrity components 708 analyzing the dataset 102, the dataset 702, and/or the data card generated for the dataset 102 to check an integrity associated with the dataset 702. In some examples, the integrity check may include determining whether one or more (e.g., all) of the data instances 104 still exist and/or are still accessible with respect to the dataset 702. For instance, and for a data instance 104, the integrity component(s) 708 may determine whether the data instance 104 may still be accessed, such as by using a link associated with the data instance 104. In some examples, if the integrity component(s) 708 determines that one or more of the data instances 104 do not exist and/or may not be accessed, then the integrity component(s) 708 may remove the data instance(s) 104 from the dataset 702 and/or remove the sources of information 706 describing the data instance(s) 104 from the dataset 702.

The process 700 may then include one or more update components 710 determining a type of update to perform with regard to the data card represented by the card data 124. For instance, and as described herein, the update component(s) 710 may process the dataset 702, using one or more processes similar to the analysis component(s) 108. Based at least on the processing, the update component(s) 710 may determine whether one or more new features, classes, and/or categories were added to the dataset 702. For a first example, if the dataset 102 included a feature such as race, the update component(s) 710 may determine that a new category has been added to the feature based at least on the sources of information 706 indicating one or more new race categories associated with the race feature. For a second example, if the dataset 102 included labels for an age feature and a race feature, the update component(s) 710 may determine that a new feature has been added to the dataset 702 based at least on the sources of information 706 indicating a new gender feature for the data instances 704.

The update component(s) 710 may then determine a type of update to perform with regard to the data card based at least on whether one or more new features, classes, and/or categories were added to the dataset 702. For instance, in some examples, the update component(s) 710 may determine to update the current data card with additional information associated with the updates to the dataset 702 when no new features, classes, and categories were added to the dataset 702. Additionally, the update component(s) 710 may determine to generate a new data card for the dataset 702 based at least on a new feature, class, or category being added to the dataset 702. In some examples, the update component(s) 710 may determine to generate the new data card when the new feature, class, or category is added to the dataset 702 since processing may need to be performed to determine whether the dataset 702 includes any new sensitive features. In any of these examples, the process 700 may include the update component(s) 710 generating and/or outputting update data 712 representing a type of update to perform with regard to the data card.

The process 100 may then be used to update the data card based at least on the type of update. For a first example, such as when the type of update includes updating the current data card, at least a portion of the process 100 may repeat in order to generate an update to the data card. For instance, the analysis component(s) 108 may determine new relevant information 110 associated with at least the updates to the dataset 702, which may be determined using at least the sources of information 706. Additionally, in some examples, new relevant information 122 associated with the updates to the dataset 702 may be input by one or more users. Input data associated with the new relevant information 110 and/or the new relevant information 122 may then be applied to the language model(s) 118 which then processes the input data in order to generate new card data 124 representing the update to the current data card.

For a second example, such as when the type of update includes generating a new data card, at least a portion of the process 100 may repeat in order to generate the new data card for the dataset 702. For instance, the analysis component(s) 108 may determine new relevant information 110 and/or a new sensitive features list 112 related to the dataset 702. Additionally, in some examples, new relevant information 122 may be input by one or more users based at least on queries represented by the query data 116. Input data associated with the new relevant information 110, the new relevant information 122, and/or the template represented by the template data 114 (and/or the current data card) may then be applied to the language model(s) 118 which processes the input data in order to generate new card data 124 representing the new data card associated with the dataset 702.

Figure 8:
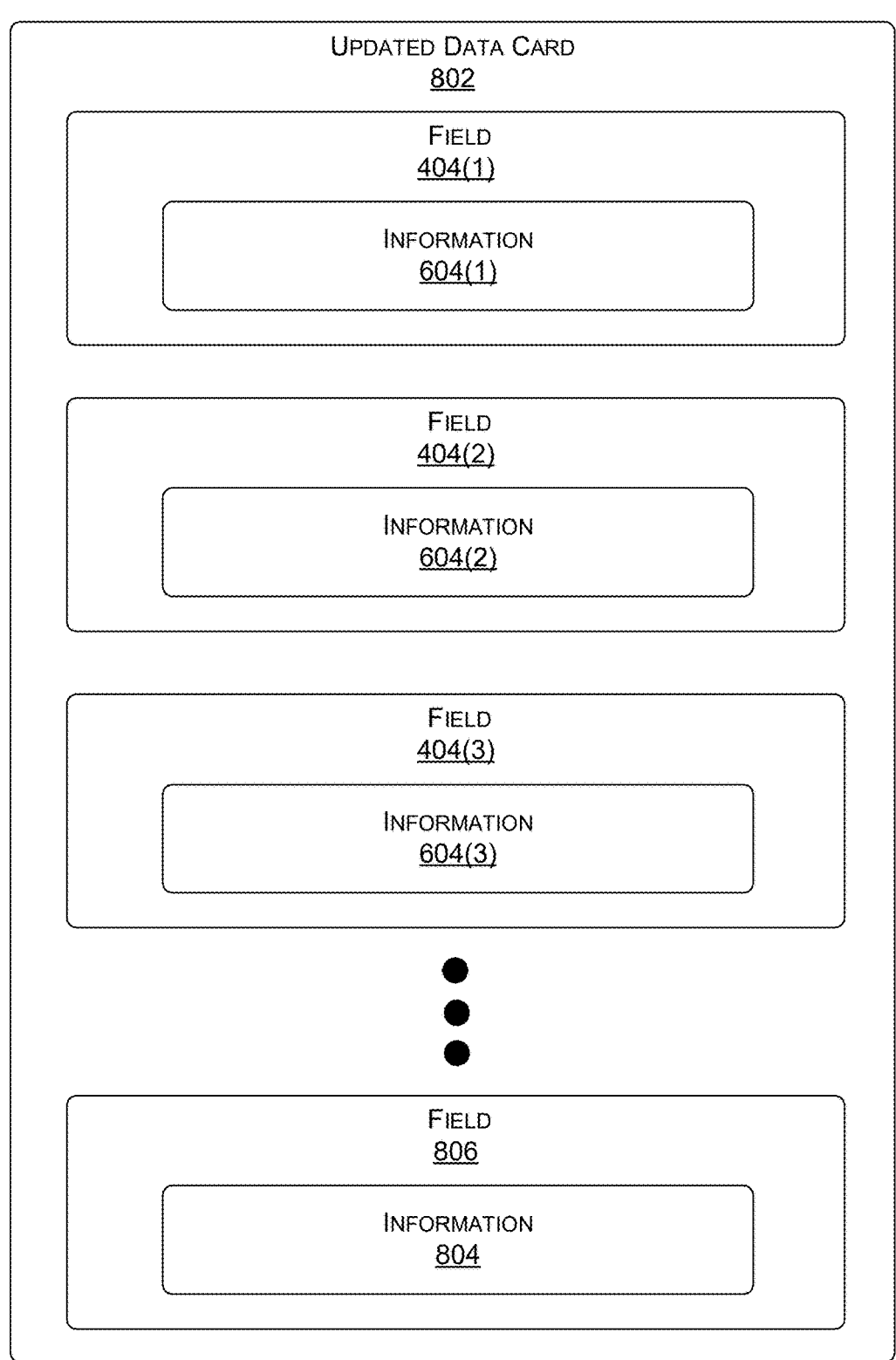
FIG. 8 illustrates an example of updating a data card to include relevant information associated with a new version of a dataset, in accordance with some embodiments of the present disclosure.

For instance, FIG. 8 illustrates an example of updating the data card 602 to include relevant information associated with a new version of a dataset, in accordance with some embodiments of the present disclosure. As shown, the data card 602 may be updated to include an updated data card 802 that includes both the initial relevant information 604 associated with the fields 404 along with relevant information 804 associated with a new field 806. For instance, the new field 806 may be associated with inputting the relevant information 804 that describes the update(s) that occurred to the dataset. While the example of FIG. 8 illustrates updating the data card 602 in order to generate the updated data card 802, in other examples, a new data card may be generated for the new version of the dataset.

Figure 9:
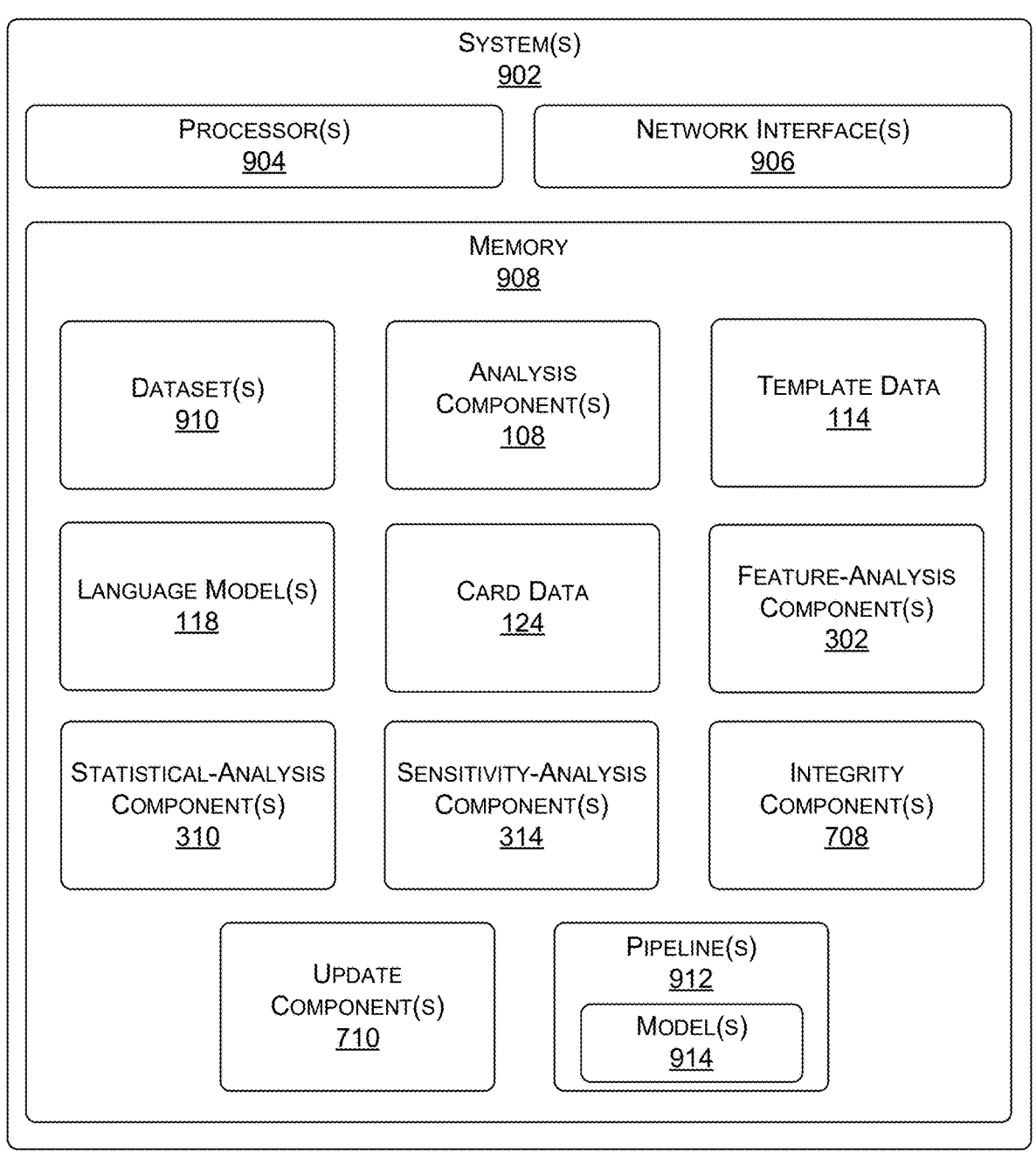
FIG. 9 illustrates an example of one or more systems that may perform one or more of the processes described herein, in accordance with some embodiments of the present disclosure.

FIG. 9 illustrates an example of one or more systems 902 (which may represent, and/or be similar to, an example computing device 1400 and/or an example data center 1500) that may perform one or more of the processes described herein, in accordance with some embodiments of the present disclosure. As shown, the system(s) 902 may include one or more processors 904 (which may be represent to, and/or be similar to, a CPU(s) 1406 and/or a GPU(s) 1408), one or more communication interfaces 906 (which may represent, and/or be similar to, a communication interface 1410), and memory 908 (which may represent, and/or be similar to, a memory 1404). However, in other examples, the system(s) 902 may include additional and/or alternative types of hardware.

The memory 908 may store one or more datasets 910 (which may represent, and/or be similar to, the dataset 102 and/or the dataset 702), the analysis component(s) 108, the template data 114, the language model(s) 118, the card data 124, the feature-analysis component(s) 302, the statistical-analysis component(s) 310, the sensitivity-analysis component(s) 314, the integrity component(s) 708, and/or the update component(s) 710. Additionally, the processor(s) 904 may execute the analysis component(s) 108, the language model(s) 118, the feature-analysis component(s) 302, the statistical-analysis component(s) 310, the sensitivity-analysis component(s) 314, the integrity component(s) 708, and/or the update component(s) 710 to perform one or more of the processes described herein. For example, the processor(s) 904 may execute the analysis component(s) 108, the language model(s) 118, the feature-analysis component(s) 302, the statistical-analysis component(s) 310, the sensitivity-analysis component(s) 314, the integrity component(s) 708, and/or the update component(s) 710 to perform to generate any number of data cards associated with any number of datasets 910.

While the example of FIG. 9 illustrates the analysis component(s) 108, the language model(s) 118, the feature-analysis component(s) 302, the statistical-analysis component(s) 310, the sensitivity-analysis component(s) 314, the integrity component(s) 708, and/or the update component(s) 710 as including software components stored in the memory 908, in other examples, one or more of the analysis component(s) 108, the language model(s) 118, the feature-analysis component(s) 302, the statistical-analysis component(s) 310, the sensitivity-analysis component(s) 314, the integrity component(s) 708, and/or the update component(s) 710 may include other types of components. For example, one or more of the analysis component(s) 108, the language model(s) 118, the feature-analysis component(s) 302, the statistical-analysis component(s) 310, the sensitivity-analysis component(s) 314, the integrity component(s) 708, and/or the update component(s) 710 may include hardware components associated with the system(s) 902.

As further illustrated in the example of FIG. 9, the system(s) 902 may store one or more machine learning pipelines 912 that the system(s) 902 uses to train, update, and/or deploy one or more machine learning models 914. In some examples, the system(s) 902 may integrate the data cards into the machine learning pipeline(s) 912 for performing the training, updating, and/or deployment. For instance, the system(s) 902 may use the data cards to determine which datasets 910 to use to perform the training and/or updating of the machine learning model(s) 914. For example, if a machine learning pipeline 912 is being used to train a machine learning model(s) 914 for face detection, then the system(s) 902 may use the data cards to select one or more datasets 910 that include the correct training data needed for face detection and/or do not include any bias that may cause problems with the machine learning model(s) 914 during deployment.

Additionally, when receiving a request for a machine learning model 914, the system(s) 902 may use the data cards to select a machine learning model 914 that is best trained for the deployment. For example, the system(s) 902 may use a data card to ensure that the machine learning model 914 to was trained using specific types of data and/or that the machine learning model 914 may not include any bias that causes problems during deployment.

Now referring to FIGS. 10-12, each block of methods 1000, 1100, and 1200, described herein, comprises a computing process that may be performed using any combination of hardware, firmware, and/or software. For instance, various functions may be carried out by a processor executing instructions stored in memory. The methods 1000, 1100, and 1200 may also be embodied as computer-usable instructions stored on computer storage media. The methods 1000, 1100, and 1200 may be provided by a standalone application, a service or hosted service (standalone or in combination with another hosted service), or a plug-in to another product, to name a few. In addition, methods 1000, 1100, and 1200 are described, by way of example, with respect to FIGS. 1, 3, and 10. However, these methods 1000, 1100, and 1200 may additionally or alternatively be executed by any one system, or any combination of systems, including, but not limited to, those described herein.

FIG. 10 illustrates a flow diagram showing a method 1000 for generating a data card associated with a dataset, in accordance with some embodiments of the present disclosure. The method 1000, at block B1002, may include determining, based at least on analyzing a dataset, first information associated with the dataset. For instance, the analysis component(s) 108 may analyze the dataset 102, such as the data instances 104 and/or the sources of information 106, in order to determine the relevant information 110 associated with the dataset 102. As described herein, the relevant information 110 may include, but is not limited to, a snapshot of the dataset 102, statistics for distributions of features included in the dataset 102, possible sensitive features, access rights for the dataset 102, dataset versions and modification dates, dataset training, testing, and validation data distributions, annotation characteristics, quality metrics and visualizations, and/or any other information that may be relevant to the dataset 102.

The method 1000, at block B1004, may include applying input data associated with the first information to one or more language models. For instance, the analysis component(s) 108 may apply the input data associated with at least the relevant information 110 to the language model(s) 118. In some examples, the input data may be associated with additional information for generating the data card, such as the template represented by the template data 114, the relevant information 122, and/or a prompt. Additionally, in some examples, preprocessing may be performed on the information to generate the input data, such as by tokenizing the information to generate tokens represented by the input data.

The method 1000, at block B1006, may include generating, based at least on the one or more language models processing the input data, output data associated with a data card that includes second information describing the dataset. For instance, the language model(s) 118 may process the input data and, based at least on the processing, generate the card data 124 associated with the data card for the dataset 102. As described herein, the data card may include the second information that is relevant to the dataset 102. Additionally, the data card may include a format that is based on the template represented by the template data 114, such as by including specified fields of information and/or a specific arrangement for the fields.

The method 1000, at block B1008, may include performing one or more operations using the data card. For instance, the card data 124 may be stored in association with the dataset 102. This way, one or more users and/or systems that may use the dataset 102 to perform one or more applications, such as training a machine learning model to perform a task, may be able to use the data card to determine whether the dataset 102 is satisfactory for performing the application(s). For example, if a user and/or a system wants to use the dataset 102 to train a machine learning model to perform vehicle recognition, then the user and/or the system may use the data card to determine whether the dataset 102 includes the correct type of data to train the machine learning model for vehicle detection (e.g., images of vehicles), whether the dataset 102 includes enough data to train the machine learning model, whether the dataset 102 includes any sensitive features (e.g., bias) that may impact the training, and/or any other relevant information before using the dataset 102.

FIG. 11 illustrates a flow diagram showing a method 1100 for generating a data card associated with an updated version of a dataset, in accordance with some embodiments of the present disclosure. The method 1100, at block B1102, may include determining that a first version of a dataset has been updated to a second version of the dataset. For instance, the update component(s) 710 may determine that the first version of the dataset 102 was updated to the second version of the dataset 702. In some examples, the update component(s) 710 may also determine whether the update(s) to the first version of the dataset 102 included adding any new features and/or classes associated with the data instances 704. The update component(s) 710 may then determine a type of update to perform associated with a data card, such as updating a current version of the data card or generating a new data card, based at least on whether the new features and/or classes were added.

The method 1100, at block B1104, may include analyzing at least the second version of the dataset to identify information related to at least one or more updates that occurred to the first version of the dataset. For instance, the analysis component(s) 108 may analyze the second version of the dataset 702, such as the data instances 704 and/or the sources of information 706, in order to determine the relevant information 110 associated with the update(s) to the first version of the dataset 102. In some examples, such as when a new feature and/or class has not been added to the second version of the dataset 702, the analysis component(s) 108 may only determine the relevant information 110 associated with the update(s). However, in some examples, such as when a new feature and/or class has been added to the second version of the dataset 702, the analysis component(s) 108 may determine the relevant information 110 and/or the sensitive features list 112 for the entire second version of the dataset 702.

The method 1100, at block B1106, may include generating, based at least on one or more language models processing input data associated with the first information, output data associated with a data card that includes second information describing the second version of the dataset. For instance, the language model(s) 118 may process the input data associated with the relevant information 110 and/or the sensitive features list 112. Based at least on the processing, the language model(s) 118 may generate the card data 124 associated with the data card. In some examples, such as when a new feature and/or class has not been added to the second version of the dataset 702, the data card may represent an update to a current data card. However, in some examples, such as when a new feature and/or class has been added to the second version of the dataset 702, the data card may include a new data card for the second version of the dataset 702.

The method 1100, at block B1108, may include performing one or more operations using the data card. For instance, the card data 124 may be stored in association with the second version of the dataset 702. This way, one or more users that may use the second version of the dataset 702 to perform one or more applications, such as training a machine learning model to perform a task, may be able to use the data card to determine whether the dataset 702 is satisfactory for performing the application(s).

FIG. 12 illustrates a flow diagram 1200 showing a method for identifying a sensitive feature associated with a dataset, in accordance with some embodiments of the present disclosure. The method 1200, at block B1202, may include determining feature names associated with a dataset. For instance, the feature-analysis component(s) 302 may analyze the dataset 102, such as the sources of information 106, to determine the feature names associated with the features. As described herein, the features may describe the data instances 104 included in the dataset 102.

The method 1200, at block B1204, may include determining, based at least on the feature names and one or more protected classes, at least a protected feature associated with the dataset. For instance, the feature-analysis component(s) 302 may compare the feature names to the protected class (es) in order to determine that a feature name is similar to a protected class. As described herein, in some examples, to perform the comparison, the feature-analysis component(s) 302 may initially generate first embeddings associated with the feature names and one or more second embeddings associated with the protected class(es). The feature-analysis component(s) 302 may then determine that the feature name is similar to the protected class using the embeddings.

The method 1200, at block B1206, may include determining one or more statistics associated with the protected feature as represented by the dataset. For instance, the statistical-analysis component(s) 310 may analyze the dataset 102 in order to determine variances associates with the features. In some examples, to determine the variance associated with a feature, the statistical-analysis component(s) 310 may determine counts associated with categories within the feature and then use the counts to determine the variance. In some examples, the statistical-analysis component(s) 310 may determine additional statistics associated with the features, such as the feature entropies and/or the feature impurities.

The method 1200, at block B1208, may include determining, based at least on the one or more statistics, whether the protected feature includes a sensitive feature. For instance, the sensitivity-analysis component(s) 314 may use the statistics to determine whether the potential feature is a sensitive feature. In some examples, the sensitivity-analysis component(s) 314 may determine that the protected feature is a sensitive feature when there is a high variance associated with the protected feature or determine that the protected feature is not a sensitive feature when there is a low variance associated with the protected feature. In such examples, the sensitivity-analysis component(s) 314 may determine that there is a high variance when the feature impurity does not satisfy (e.g., is less than) a threshold value.

Example Language Models

In at least some embodiments, language models, such as large language models (LLMs), Small Language Models (SLMs), vision language models (VLMs), multi-modal language models (MMLMs), and/or other types of generative artificial intelligence (AI) may be implemented. These models may be capable of understanding, summarizing, translating, and/or otherwise generating text (e.g., natural language text, code, etc.), images, video, computer aided design (CAD) assets, OMNIVERSE and/or METAVERSE file information (e.g., in USD format, such as OpenUSD), and/or the like, based on the context provided in input prompts or queries. These language models may be considered "large," in embodiments, based on the models being trained on massive datasets and having architectures with large number of learnable network parameters (weights and biases)—such as millions or billions of parameters. The LLMs/VLMs/MMLMs/etc. may be implemented for summarizing textual data, analyzing and extracting insights from data (e.g., textual, image, video, etc.), and generating new text/image/video/etc. in user-specified styles, tones, and/or formats. The LLMs/VLMs/MMLMs/etc. of the present disclosure may be used exclusively for text processing, in embodiments, whereas in other embodiments, multi-modal LLMs may be implemented to accept, understand, and/or generate text and/or other types of content like images, audio, 2D and/or 3D data (e.g., in USD formats), and/or video. For example, vision language models (VLMs), or more generally multi-modal language models (MMLMs), may be implemented to accept image, video, audio, textual, 3D design (e.g., CAD), and/or other inputs data types and/or to generate or output image, video, audio, textual, 3D design, and/or other output data types.

Various types of LLMs/SLMs/VLMs/MMLMs/etc. architectures may be implemented in various embodiments. For example, different architectures may be implemented that use different techniques for understanding and generating outputs-such as text, audio, video, image, 2D and/or 3D design or asset data, etc. In some embodiments, LLMs/SLMs/VLMs/MMLMs/etc. architectures such as recurrent neural networks (RNNs) or long short-term memory networks (LSTMs) may be used, while in other embodiments transformer architectures-such as those that rely on self-attention and/or cross-attention (e.g., between contextual data and textual data) mechanisms—may be used to understand and recognize relationships between words or tokens and/or contextual data (e.g., other text, video, image, design data, USD, etc.). One or more generative processing pipelines that include LLMs/SLMs/VLMs/MMLMs/etc. may also include one or more diffusion block(s) (e.g., denoisers). The LLMs/SLMs/VLMs/MMLMs/etc. of the present disclosure may include encoder and/or decoder block(s). For example, discriminative or encoder-only models like BERT (Bidirectional Encoder Representations from Transformers) may be implemented for tasks that involve language comprehension such as classification, sentiment analysis, question answering, and named entity recognition. As another example, generative or decoder-only models like GPT (Generative Pretrained Transformer) may be implemented for tasks that involve language and content generation such as text completion, story generation, and dialogue generation. LLMs/SLMs/VLMs/MMLMs/etc. that include both encoder and decoder components like T5 (Text-to-Text Transformer) may be implemented to understand and generate content, such as for translation and summarization. These examples are not intended to be limiting, and any architecture type—including but not limited to those described herein—may be implemented depending on the particular embodiment and the task(s) being performed using the LLMs/SLMs/VLMs/MMLMs/etc.

In various embodiments, the LLMs/SLMs/VLMs/MMLMs/etc. may be trained using unsupervised learning, in which an LLMs/SLMs/VLMs/MMLMs/etc. learns patterns from large amounts of unlabeled text/audio/video/image/design/USD/etc. data. Due to the extensive training, in embodiments, the models may not require task-specific or domain-specific training. LLMs/SLMs/VLMs/MMLMs/etc. that have undergone extensive pre-training on vast amounts of unlabeled data may be referred to as foundation models and may be adept at a variety of tasks like question-answering, summarization, filling in missing information, translation, image/video/design/USD/data generation. Some LLMs/SLMs/VLMs/MMLMs/etc. may be tailored for a specific use case using techniques like prompt tuning, fine-tuning, retrieval augmented generation (RAG), adding adapters (e.g., customized neural networks, and/or neural network layers, that tune or adjust prompts or tokens to bias the language model toward a particular task or domain), and/or using other fine-tuning or tailoring techniques that optimize the models for use on particular tasks and/or within particular domains.

In some embodiments, the LLMs/SLMs/VLMs/MMLMs/etc. of the present disclosure may be implemented using various model alignment techniques. For example, in some embodiments, guardrails may be implemented to identify improper or undesired inputs (e.g., prompts) and/or outputs of the models. In doing so, the system may use the guardrails and/or other model alignment techniques to either prevent a particular undesired input from being processed using the LLMs/SLMs/VLMs/MMLMs/etc., and/or preventing the output or presentation (e.g., display, audio output, etc.) of information generating using the LLMs/SLMs/VLMs/MMLMs/etc. In some embodiments, one or more additional models—or layers thereof—may be implemented to identify issues with inputs and/or outputs of the models. For example, these "safeguard" models may be trained to identify inputs and/or outputs that are "safe" or otherwise okay or desired and/or that are "unsafe" or are otherwise undesired for the particular application/implementation. As a result, the LLMs/SLMs/VLMs/MMLMs/etc. of the present disclosure may be less likely to output language/text/audio/video/design data/USD data/etc. that may be offensive, vulgar, improper, unsafe, out of domain, and/or otherwise undesired for the particular application/implementation.

In some embodiments, the LLMs/SLMs/VLMs/etc. may be configured to or capable of accessing or using one or more plug-ins, application programming interfaces (APIs), databases, data stores, repositories, etc. For example, for certain tasks or operations that the model is not ideally suited for, the model may have instructions (e.g., as a result of training, and/or based on instructions in a given prompt) to access one or more plug-ins (e.g., $3^{rd}$ party plugins) for help in processing the current input. In such an example, where at least part of a prompt is related to restaurants or weather, the model may access one or more restaurant or weather plug-ins (e.g., via one or more APIs) to retrieve the relevant information. As another example, where at least part of a response requires a mathematical computation, the model may access one or more math plug-ins or APIs for help in solving the problem(s), and may then use the response from the plug-in and/or API in the output from the model. This process may be repeated—e.g., recursively—for any number of iterations and using any number of plug-ins and/or APIs until a response to the input prompt can be generated that addresses each ask/question/request/process/operation/etc. As such, the model(s) may not only rely on its own knowledge from training on a large dataset(s), but also on the expertise or optimized nature of one or more external resources—such as APIs, plug-ins, and/or the like.

In some embodiments, multiple language models (e.g., LLMs/SLMs/VLMs/MMLMs/etc., multiple instances of the same language model, and/or multiple prompts provided to the same language model or instance of the same language model may be implemented, executed, or accessed (e.g., using one or more plug-ins, user interfaces, APIs, databases, data stores, repositories, etc.) to provide output responsive to the same query, or responsive to separate portions of a query. In at least one embodiment, multiple language models e.g., language models with different architectures, language models trained on different (e.g. updated) corpuses of data may be provided with the same input query and prompt (e.g., set of constraints, conditioners, etc.). In one or more embodiments, the language models may be different versions of the same foundation model. In one or more embodiments, at least one language model may be instantiated as multiple agents—e.g., more than one prompt may be provided to constrain, direct, or otherwise influence a style, a content, or a character, etc., of the output provided. In one or more example, non-limiting embodiments, the same language model may be asked to provide output corresponding to a different role, perspective, character, or having a different base of knowledge, etc.—as defined by a supplied prompt. In any one of such embodiments, the output of two or more (e.g., each) language models, two or more versions of at least one language model, two or more instanced agents of at least one language model, and/or two more prompts provided to at least one language model may be further processed, e.g., aggregated, compared or filtered against, or used to determine (and provide) a consensus response. In one or more embodiments, the output from one language model—or version, instance, or agent—maybe be provided as input to another language model for further processing and/or validation. In one or more embodiments, a language model may be asked to generate or otherwise obtain an output with respect to an input source material, with the output being associated with the input source material. Such an association may include, for example, the generation of a caption or portion of text that is embedded (e.g., as metadata) with an input source text or image. In one or more embodiments, an output of a language model may be used to determine the validity of an input source material for further processing, or inclusion in a dataset. For example, a language model may be used to assess the presence (or absence) of a target word in a portion of text or an object in an image, with the text or image being annotated to note such presence (or lack thereof). Alternatively, the determination from the language model may be used to determine whether the source material should be included in a curated dataset, for example and without limitation.

Figure 13A:
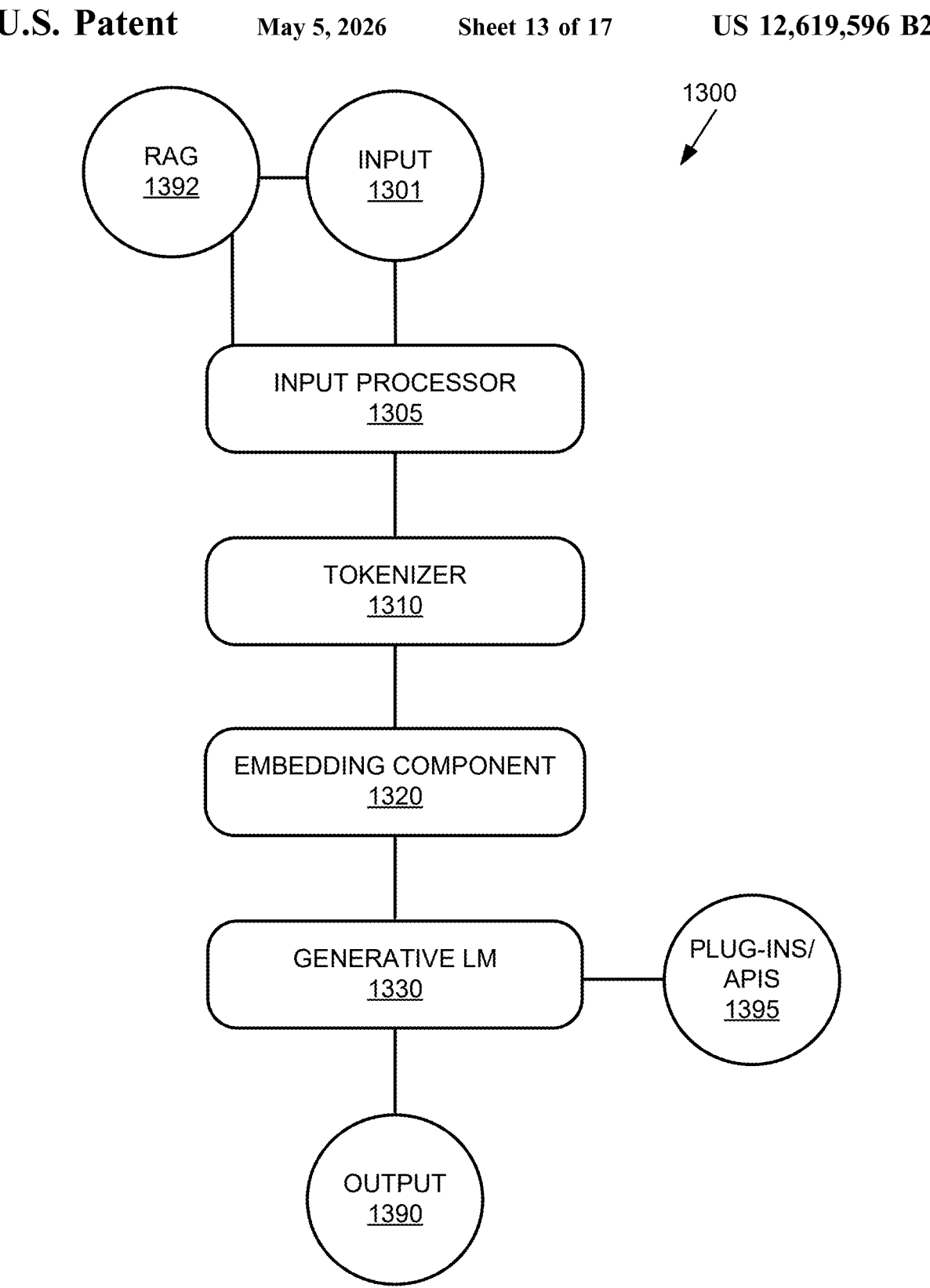
FIG. 13A is a block diagram of an example generative language model system suitable for use in implementing some embodiments of the present disclosure.

FIG. 13A is a block diagram of an example generative language model system 1300 suitable for use in implementing at least some embodiments of the present disclosure. In the example illustrated in FIG. 13A, the generative language model system 1300 includes a retrieval augmented generation (RAG) component 1392, an input processor 1305, a tokenizer 1310, an embedding component 1320, plug-ins/APIs 1395, and a generative language model (LM) 1330 (which may include an LLM, a VLM, a multi-modal LM, etc.).

At a high level, the input processor 1305 may receive an input 1301 comprising text and/or other types of input data (e.g., audio data, video data, image data, sensor data (e.g., LiDAR, RADAR, ultrasonic, etc.), 3D design data, CAD data, universal scene descriptor (USD) data—such as OpenUSD, etc.), depending on the architecture of the generative LM 1330 (e.g., LLM/VLM/MMLM/etc.). In some embodiments, the input 1301 includes plain text in the form of one or more sentences, paragraphs, and/or documents. Additionally or alternatively, the input 1301 may include numerical sequences, precomputed embeddings (e.g., word or sentence embeddings), and/or structured data (e.g., in tabular formats, JSON, or XML). In some implementations in which the generative LM 1330 is capable of processing multi-modal inputs, the input 1301 may combine text (or may omit text) with image data, audio data, video data, design data, USD data, and/or other types of input data, such as but not limited to those described herein. Taking raw input text as an example, the input processor 1305 may prepare raw input text in various ways. For example, the input processor 1305 may perform various types of text filtering to remove noise (e.g., special characters, punctuation, HTML tags, stopwords, portions of an image(s), portions of audio, etc.) from relevant textual content. In an example involving stopwords (common words that tend to carry little semantic meaning), the input processor 1305 may remove stopwords to reduce noise and focus the generative LM 1330 on more meaningful content. The input processor 1305 may apply text normalization, for example, by converting all characters to lowercase, removing accents, and/or or handling special cases like contractions or abbreviations to ensure consistency. These are just a few examples, and other types of input processing may be applied.

In some embodiments, a RAG component 1392 (which may include one or more RAG models, and/or may be performed using the generative LM 1330 itself) may be used to retrieve additional information to be used as part of the input 1301 or prompt. RAG may be used to enhance the input to the LLM/SLMs/VLM/MMLM/etc. with external knowledge, so that answers to specific questions or queries or requests are more relevant-such as in a case where specific knowledge is required. The RAG component 1392 may fetch this additional information (e.g., grounding information, such as grounding text/image/video/audio/USD/CAD/etc.) from one or more external sources, which can then be fed to the LLM/SLMs/VLM/MMLM/etc. along with the prompt to improve accuracy of the responses or outputs of the model.

For example, in some embodiments, the input 1301 may be generated using the query or input to the model (e.g., a question, a request, etc.) in addition to data retrieved using the RAG component 1392. In some embodiments, the input processor 1305 may analyze the input 1301 and communicate with the RAG component 1392 (or the RAG component 1392 may be part of the input processor 1305, in embodiments) in order to identify relevant text and/or other data to provide to the generative LM 1330 as additional context or sources of information from which to identify the response, answer, or output 1390, generally. For example, where the input indicates that the user is interested in a desired tire pressure for a particular make and model of vehicle, the RAG component 1392 may retrieve—using a RAG model performing a vector search in an embedding space, for example—the tire pressure information or the text corresponding thereto from a digital (embedded) version of the user manual for that particular vehicle make and model. Similarly, where a user revisits a chatbot related to a particular product offering or service, the RAG component 1392 may retrieve a prior stored conversation history—or at least a summary thereof—and include the prior conversation history along with the current ask/request as part of the input 1301 to the generative LM 1330.

The RAG component 1392 may use various RAG techniques. For example, naïve RAG may be used where documents are indexed, chunked, and applied to an embedding model to generate embeddings corresponding to the chunks. A user query may also be applied to the embedding model and/or another embedding model of the RAG component 1392 and the embeddings of the chunks along with the embeddings of the query may be compared to identify the most similar/related embeddings to the query, which may be supplied to the generative LM 1330 to generate an output.

In some embodiments, more advanced RAG techniques may be used. For example, prior to passing chunks to the embedding model, the chunks may undergo pre-retrieval processes (e.g., routing, rewriting, metadata analysis, expansion, etc.). In addition, prior to generating the final embeddings, post-retrieval processes (e.g., re-ranking, prompt compression, etc.) may be performed on the outputs of the embedding model prior to final embeddings being used as comparison to an input query.

As a further example, modular RAG techniques may be used, such as those that are similar to naïve and/or advanced RAG, but also include features such as hybrid search, recursive retrieval and query engines, StepBack approaches, sub-queries, and hypothetical document embedding.

As another example, Graph RAG may use knowledge graphs as a source of context or factual information. Graph RAG may be implemented using a graph database as a source of contextual information sent to the LLM/SLMs/VLM/MMLM/etc. Rather than (or in addition to) providing the model with chunks of data extracted from larger sized documents—which may result in a lack of context, factual correctness, language accuracy, etc. —graph RAG may also provide structured entity information to the LLM/SLMs/VLM/MMLM/etc. by combining the structured entity textual description with its many properties and relationships, allowing for deeper insights by the model. When implementing graph RAG, the systems and methods described herein use a graph as a content store and extract relevant chunks of documents and ask the LLM/SLMs/VLM/MMLM/etc. to answer using them. The knowledge graph, in such embodiments, may contain relevant textual content and metadata about the knowledge graph as well as be integrated with a vector database. In some embodiments, the graph RAG may use a graph as a subject matter expert, where descriptions of concepts and entities relevant to a query/prompt may be extracted and passed to the model as semantic context. These descriptions may include relationships between the concepts. In other examples, the graph may be used as a database, where part of a query/prompt may be mapped to a graph query, the graph query may be executed, and the LLM/SLMs/VLM/MMLM/etc. may summarize the results. In such an example, the graph may store relevant factual information, and a query (natural language query) to graph query tool (NL-to-Graph-query tool) and entity linking may be used. In some embodiments, graph RAG (e.g., using a graph database) may be combined with standard (e.g., vector database) RAG, and/or other RAG types, to benefit from multiple approaches.

In any embodiments, the RAG component 1392 may implement a plugin, API, user interface, and/or other functionality to perform RAG. For example, a graph RAG plug-in may be used by the LLM/VVLM/MMLM/etc. to run queries against the knowledge graph to extract relevant information for feeding to the model, and a standard or vector RAG plug-in may be used to run queries against a vector database. For example, the graph database may interact with a plug-in's REST interface such that the graph database is decoupled from the vector database and/or the embeddings models.

The tokenizer 1310 may segment the (e.g., processed) text data into smaller units (tokens) for subsequent analysis and processing. The tokens may represent individual words, subwords, characters, portions of audio/video/image/etc., depending on the implementation. Word-based tokenization divides the text into individual words, treating each word as a separate token. Subword tokenization breaks down words into smaller meaningful units (e.g., prefixes, suffixes, stems), enabling the generative LM 1330 to understand morphological variations and handle out-of-vocabulary words more effectively. Character-based tokenization represents each character as a separate token, enabling the generative LM 1330 to process text at a fine-grained level. The choice of tokenization strategy may depend on factors such as the language being processed, the task at hand, and/or characteristics of the training dataset. As such, the tokenizer 1310 may convert the (e.g., processed) text into a structured format according to tokenization schema being implemented in the particular embodiment.

The embedding component 1320 may use any known embedding technique to transform discrete tokens into (e.g., dense, continuous vector) representations of semantic meaning. For example, the embedding component 1320 may use pre-trained word embeddings (e.g., Word2Vec, GloVe, or FastText), one-hot encoding, Term Frequency-Inverse Document Frequency (TF-IDF) encoding, one or more embedding layers of a neural network, and/or otherwise.

In some implementations in which the input 1301 includes image data/video data/etc., the input processor 1301 may resize the data to a standard size compatible with format of a corresponding input channel and/or may normalize pixel values to a common range (e.g., 0 to 1) to ensure a consistent representation, and the embedding component 1320 may encode the image data using any known technique (e.g., using one or more convolutional neural networks (CNNs) to extract visual features). In some implementations in which the input 1301 includes audio data, the input processor 1301 may resample an audio file to a consistent sampling rate for uniform processing, and the embedding component 1320 may use any known technique to extract and encode audio features—such as in the form of a spectrogram (e.g., a mel-spectrogram). In some implementations in which the input 1301 includes video data, the input processor 1301 may extract frames or apply resizing to extracted frames, and the embedding component 1320 may extract features such as optical flow embeddings or video embeddings and/or may encode temporal information or sequences of frames. In some implementations in which the input 1301 includes multi-modal data, the embedding component 1320 may fuse representations of the different types of data (e.g., text, image, audio, USD, video, design, etc.) using techniques like early fusion (concatenation), late fusion (sequential processing), attention-based fusion (e.g., self-attention, cross-attention), etc.

The generative LM 1330 and/or other components of the generative LM system 1300 may use different types of neural network architectures depending on the implementation. For example, transformer-based architectures such as those used in models like GPT may be implemented, and may include self-attention mechanisms that weigh the importance of different words or tokens in the input sequence and/or feedforward networks that process the output of the self-attention layers, applying non-linear transformations to the input representations and extracting higher-level features. Some non-limiting example architectures include transformers (e.g., encoder-decoder, decoder only, multi-modal), RNNs, LSTMs, fusion models, diffusion models, cross-modal embedding models that learn joint embedding spaces, graph neural networks (GNNs), hybrid architectures combining different types of architectures adversarial networks like generative adversarial networks or GANs or adversarial autoencoders (AAEs) for joint distribution learning, and others. As such, depending on the implementation and architecture, the embedding component 1320 may apply an encoded representation of the input 1301 to the generative LM 1330, and the generative LM 1330 may process the encoded representation of the input 1301 to generate an output 1390, which may include responsive text and/or other types of data.

As described herein, in some embodiments, the generative LM 1330 may be configured to access or use—or capable of accessing or using—plug-ins/APIs 1395 (which may include one or more plug-ins, application programming interfaces (APIs), databases, data stores, repositories, etc.). For example, for certain tasks or operations that the generative LM 1330 is not ideally suited for, the model may have instructions (e.g., as a result of training, and/or based on instructions in a given prompt, such as those retrieved using the RAG component 1392) to access one or more plug-ins/APIs 1395 (e.g., $3^{rd}$ party plugins) for help in processing the current input. In such an example, where at least part of a prompt is related to restaurants or weather, the model may access one or more restaurant or weather plug-ins (e.g., via one or more APIs), send at least a portion of the prompt related to the particular plug-in/API 1395 to the plug-in/API 1395, the plug-in/API 1395 may process the information and return an answer to the generative LM 1330, and the generative LM 1330 may use the response to generate the output 1390. This process may be repeated—e.g., recursively—for any number of iterations and using any number of plug-ins/APIs 1395 until an output 1390 that addresses each ask/question/request/process/operation/etc. from the input 1301 can be generated. As such, the model(s) may not only rely on its own knowledge from training on a large dataset(s) and/or from data retrieved using the RAG component 1392, but also on the expertise or optimized nature of one or more external resources—such as the plug-ins/APIs 1395.

Figure 13B:
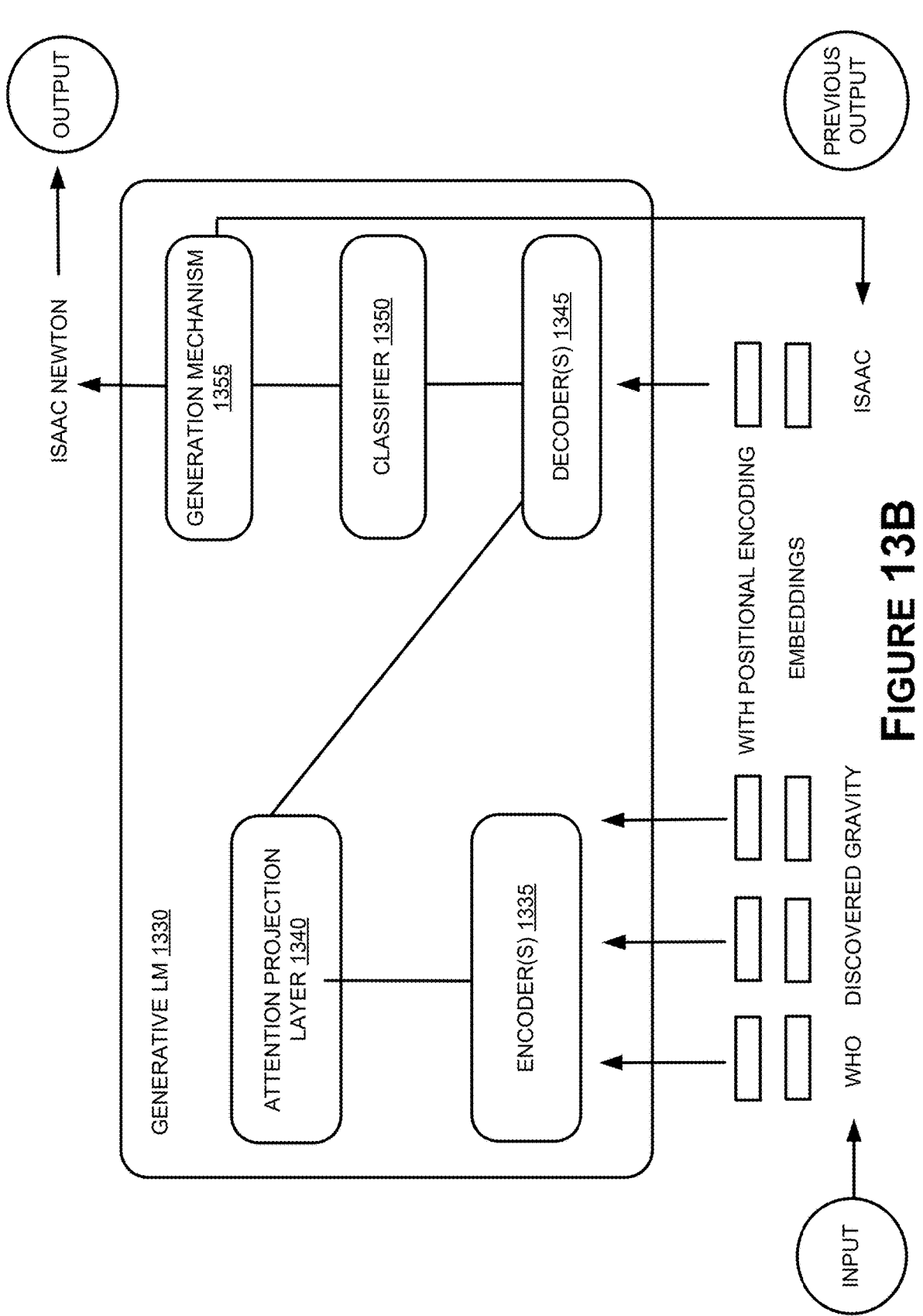
FIG. 13B is a block diagram of an example generative language model that includes a transformer encoder-decoder suitable for use in implementing some embodiments of the present disclosure.

FIG. 13B is a block diagram of an example implementation in which the generative LM 1330 includes a transformer encoder-decoder. For example, assume input text such as "Who discovered gravity" is tokenized (e.g., by the tokenizer 1310 of FIG. 13A) into tokens such as words, and each token is encoded (e.g., by the embedding component 1320 of FIG. 913A) into a corresponding embedding (e.g., of size 512). Since these token embeddings typically do not represent the position of the token in the input sequence, any known technique may be used to add a positional encoding to each token embedding to encode the sequential relationships and context of the tokens in the input sequence. As such, the (e.g., resulting) embeddings may be applied to one or more encoder(s) 1335 of the generative LM 1330.

In an example implementation, the encoder(s) 1335 forms an encoder stack, where each encoder includes a self-attention layer and a feedforward network. In an example transformer architecture, each token (e.g., word) flows through a separate path. As such, each encoder may accept a sequence of vectors, passing each vector through the self-attention layer, then the feedforward network, and then upwards to the next encoder in the stack. Any known self-attention technique may be used. For example, to calculate a self-attention score for each token (word), a query vector, a key vector, and a value vector may be created for each token, a self-attention score may be calculated for pairs of tokens by taking the dot product of the query vector with the corresponding key vectors, normalizing the resulting scores, multiplying by corresponding value vectors, and summing weighted value vectors. The encoder may apply multi-headed attention in which the attention mechanism is applied multiple times in parallel with different learned weight matrices. Any number of encoders may be cascaded to generate a context vector encoding the input. An attention projection layer 1340 may convert the context vector into attention vectors (keys and values) for the decoder(s) 1345.

In an example implementation, the decoder(s) 1345 form a decoder stack, where each decoder includes a self-attention layer, an encoder-decoder self-attention layer that uses the attention vectors (keys and values) from the encoder to focus on relevant parts of the input sequence, and a feedforward network. As with the encoder(s) 1335, in an example transformer architecture, each token (e.g., word) flows through a separate path in the decoder(s) 1345. During a first pass, the decoder(s) 1345, a classifier 1350, and a generation mechanism 1355 may generate a first token, and the generation mechanism 1355 may apply the generated token as an input during a second pass. The process may repeat in a loop, successively generating and adding tokens (e.g., words) to the output from the preceding pass and applying the token embeddings of the composite sequence with positional encodings as an input to the decoder(s) 1345 during a subsequent pass, sequentially generating one token at a time (known as auto-regression) until predicting a symbol or token that represents the end of the response. Within each decoder, the self-attention layer is typically constrained to attend only to preceding positions in the output sequence by applying a masking technique (e.g., setting future positions to negative infinity) before the softmax operation. In an example implementation, the encoder-decoder attention layer operates similarly to the (e.g., multi-headed) self-attention in the encoder(s) 1335, except that it creates its queries from the layer below it and takes the keys and values (e.g., matrix) from the output of the encoder(s) 1335.

As such, the decoder(s) 1345 may output some decoded (e.g., vector) representation of the input being applied during a particular pass. The classifier 1350 may include a multi-class classifier comprising one or more neural network layers that project the decoded (e.g., vector) representation into a corresponding dimensionality (e.g., one dimension for each supported word or token in the output vocabulary) and a softmax operation that converts logits to probabilities. As such, the generation mechanism 1355 may select or sample a word or token based on a corresponding predicted probability (e.g., select the word with the highest predicted probability) and append it to the output from a previous pass, generating each word or token sequentially. The generation mechanism 1355 may repeat the process, triggering successive decoder inputs and corresponding predictions until selecting or sampling a symbol or token that represents the end of the response, at which point, the generation mechanism 1355 may output the generated response.

Figure 13C:
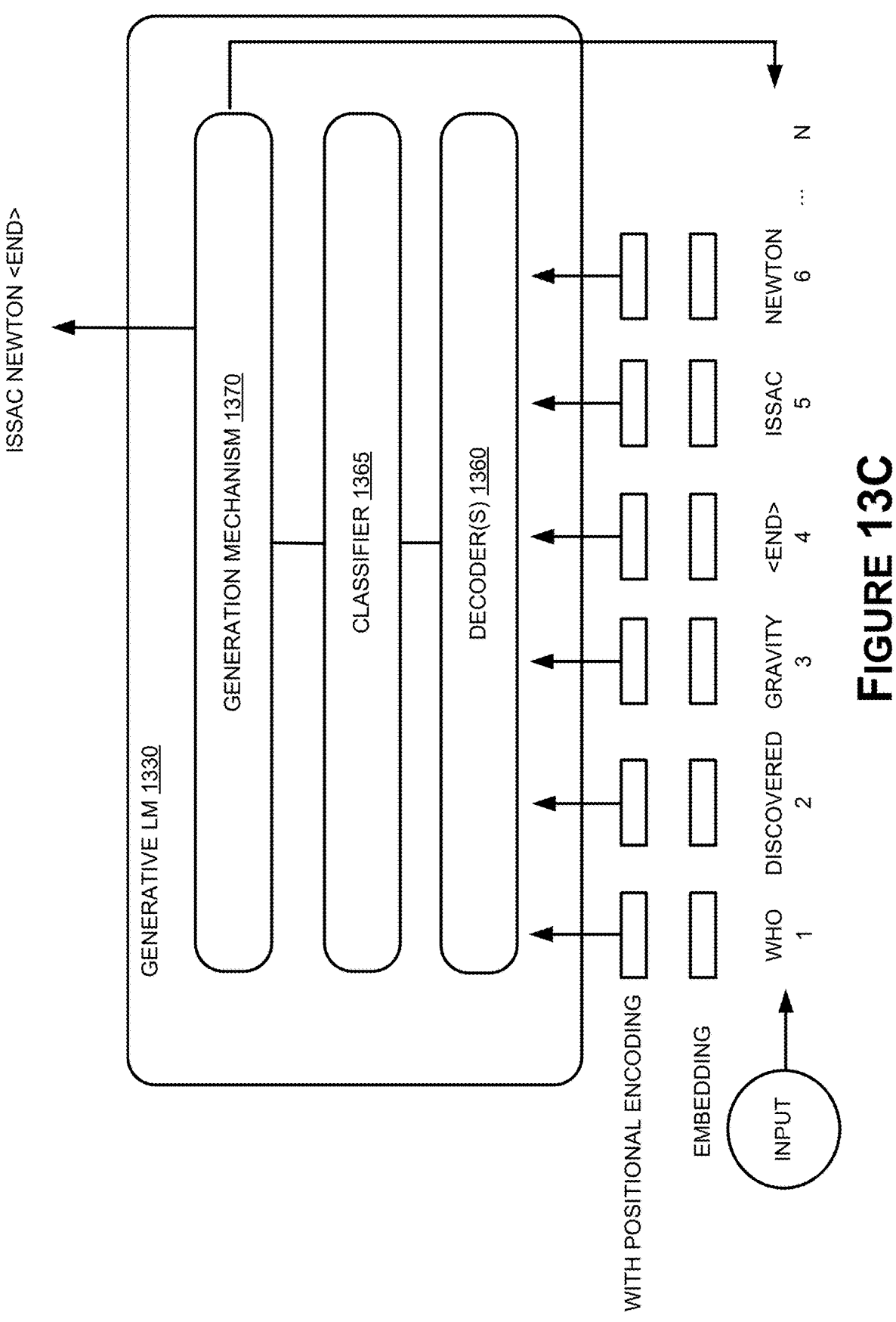
FIG. 13C is a block diagram of an example generative language model that includes a decoder-only transformer architecture suitable for use in implementing some embodiments of the present disclosure.

FIG. 13C is a block diagram of an example implementation in which the generative LM 1330 includes a decoder-only transformer architecture. For example, the decoder(s) 1360 of FIG. 13C may operate similarly as the decoder(s) 1345 of FIG. 13B except each of the decoder(s) 1360 of FIG. 13C omits the encoder-decoder self-attention layer (since there is no encoder in this implementation). As such, the decoder(s) 1360 may form a decoder stack, where each decoder includes a self-attention layer and a feedforward network. Furthermore, instead of encoding the input sequence, a symbol or token representing the end of the input sequence (or the beginning of the output sequence) may be appended to the input sequence, and the resulting sequence (e.g., corresponding embeddings with positional encodings) may be applied to the decoder(s) 1360. As with the decoder(s) 1345 of FIG. 13B, each token (e.g., word) may flow through a separate path in the decoder(s) 1360, and the decoder(s) 1360, a classifier 1365, and a generation mechanism 1370 may use auto-regression to sequentially generate one token at a time until predicting a symbol or token that represents the end of the response. The classifier 1365 and the generation mechanism 1370 may operate similarly as the classifier 1350 and the generation mechanism 1355 of FIG. 13B, with the generation mechanism 1370 selecting or sampling each successive output token based on a corresponding predicted probability and appending it to the output from a previous pass, generating each token sequentially until selecting or sampling a symbol or token that represents the end of the response. These and other architectures described herein are meant simply as examples, and other suitable architectures may be implemented within the scope of the present disclosure.

Example Computing Device

FIG. 14 is a block diagram of an example computing device(s) 1400 suitable for use in implementing some embodiments of the present disclosure. Computing device 1400 may include an interconnect system 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, one or more presentation components 1418 (e.g., display(s)), and one or more logic units 1420. In at least one embodiment, the computing device(s) 1400 may comprise one or more virtual machines (VMs), and/or any of the components thereof may comprise virtual components (e.g., virtual hardware components). For non-limiting examples, one or more of the GPUs 1408 may comprise one or more vGPUs, one or more of the CPUs 1406 may comprise one or more vCPUs, and/or one or more of the logic units 1420 may comprise one or more virtual logic units. As such, a computing device(s) 1400 may include discrete components (e.g., a full GPU dedicated to the computing device 1400), virtual components (e.g., a portion of a GPU dedicated to the computing device 1400), or a combination thereof.

Although the various blocks of FIG. 14 are shown as connected via the interconnect system 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The interconnect system 1402 may represent one or more links or busses, such as an address bus, a data bus, a control bus, or a combination thereof. The interconnect system 1402 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1406 may be directly connected to the memory 1404. Further, the CPU 1406 may be directly connected to the GPU 1408. Where there is direct, or point-to-point connection between components, the interconnect system 1402 may include a PCIe link to carry out the connection. In these examples, a PCI bus need not be included in the computing device 1400.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute at least some of the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an Advanced RISC Machines (ARM) processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

In addition to or alternatively from the CPU(s) 1406, the GPU(s) 1408 may be configured to execute at least some of the computer-readable instructions to control one or more components of the computing device 1400 to perform one or more of the methods and/or processes described herein. One or more of the GPU(s) 1408 may be an integrated GPU (e.g., with one or more of the CPU(s) 1406 and/or one or more of the GPU(s) 1408 may be a discrete GPU. In embodiments, one or more of the GPU(s) 1408 may be a coprocessor of one or more of the CPU(s) 1406. The GPU(s) 1408 may be used by the computing device 1400 to render graphics (e.g., 3D graphics) or perform general purpose computations. For example, the GPU(s) 1408 may be used for General-Purpose computing on GPUs (GPGPU). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data or any other suitable data, such as GPGPU data. The display memory may be included as part of the memory 1404. The GPU(s) 1408 may include two or more GPUs operating in parallel (e.g., via a link). The link may directly connect the GPUs (e.g., using NVLINK) or may connect the GPUs through a switch (e.g., using NVSwitch). When combined together, each GPU 1408 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1406 and/or the GPU(s) 1408, the logic unit(s) 1420 may be configured to execute at least some of the computer-readable instructions to control one or more components of the computing device 1400 to perform one or more of the methods and/or processes described herein. In embodiments, the CPU(s) 1406, the GPU(s) 1408, and/or the logic unit(s) 1420 may discretely or jointly perform any combination of the methods, processes and/or portions thereof. One or more of the logic units 1420 may be part of and/or integrated in one or more of the CPU(s) 1406 and/or the GPU(s) 1408 and/or one or more of the logic units 1420 may be discrete components or otherwise external to the CPU(s) 1406 and/or the GPU(s) 1408. In embodiments, one or more of the logic units 1420 may be a coprocessor of one or more of the CPU(s) 1406 and/or one or more of the GPU(s) 1408.

Examples of the logic unit(s) 1420 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1410 may include one or more receivers, transmitters, and/or transceivers that enable the computing device 1400 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1420 and/or communication interface 1410 may include one or more data processing units (DPUs) to transmit data received over a network and/or through interconnect system 1402 directly to (e.g., a memory of) one or more GPU(s) 1408.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, DPUs, etc.), and output the data (e.g., as an image, video, sound, etc.).

Example Data Center

Figure 15:
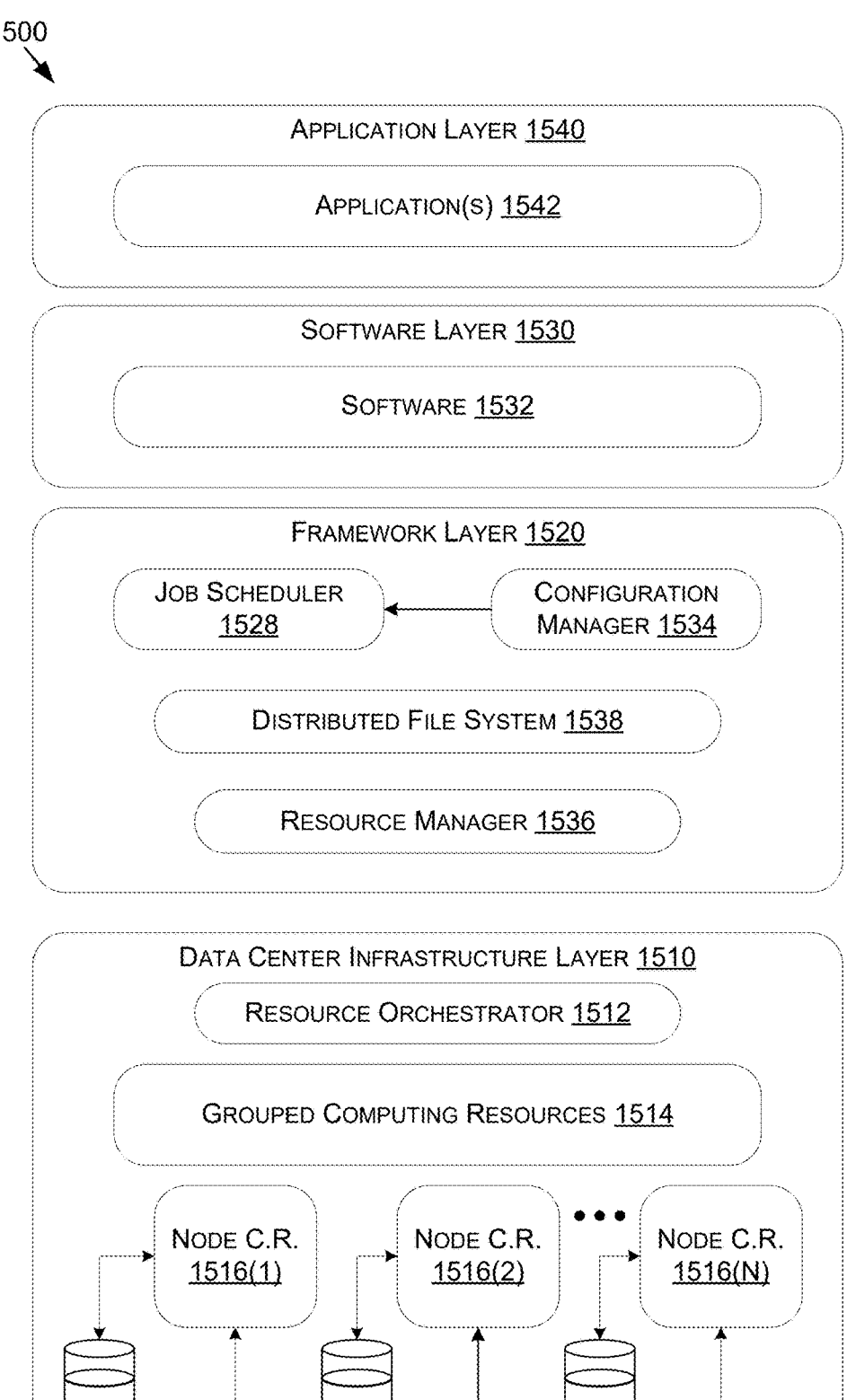
FIG. 15 is a block diagram of an example data center suitable for use in implementing some embodiments of the present disclosure.

FIG. 15 illustrates an example data center 1500 that may be used in at least one embodiments of the present disclosure. The data center 1500 may include a data center infrastructure layer 1510, a framework layer 1520, a software layer 1530, and/or an application layer 1540.

As shown in FIG. 15, the data center infrastructure layer 1510 may include a resource orchestrator 1512, grouped computing resources 1514, and node computing resources ("node C.R.s") 1516(1)-1516(N), where "N" represents any whole, positive integer. In at least one embodiment, node C.R.s 1516(1)-1516(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1516(1)-1516(N) may correspond to a server having one or more of the above-mentioned computing resources. In addition, in some embodiments, the node C.R.s 1516(1)-15161 (N) may include one or more virtual components, such as vGPUs, vCPUs, and/or the like, and/or one or more of the node C.R.s 1516(1)-1516(N) may correspond to a virtual machine (VM).

In at least one embodiment, grouped computing resources 1514 may include separate groupings of node C.R.s 1516 housed within one or more racks (not shown), or many racks housed in data centers at various geographical locations (also not shown). Separate groupings of node C.R.s 1516 within grouped computing resources 1514 may include grouped compute, network, memory or storage resources that may be configured or allocated to support one or more workloads. In at least one embodiment, several node C.R.s 1516 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1512 may configure or otherwise control one or more node C.R.s 1516(1)-1516(N) and/or grouped computing resources 1514. In at least one embodiment, resource orchestrator 1512 may include a software design infrastructure (SDI) management entity for the data center 1500. The resource orchestrator 1512 may include hardware, software, or some combination thereof.

In at least one embodiment, as shown in FIG. 15, framework layer 1520 may include a job scheduler 1528, a configuration manager 1534, a resource manager 1536, and/or a distributed file system 1538. The framework layer 1520 may include a framework to support software 1532 of software layer 1530 and/or one or more application(s) 1542 of application layer 1540. The software 1532 or application(s) 1542 may respectively include web-based service software or applications, such as those provided by Amazon Web Services, Google Cloud and Microsoft Azure. The framework layer 1520 may be, but is not limited to, a type of free and open-source software web application framework such as Apache Spark™ (hereinafter "Spark") that may utilize distributed file system 1538 for large-scale data processing (e.g., "big data"). In at least one embodiment, job scheduler 1528 may include a Spark driver to facilitate scheduling of workloads supported by various layers of data center 1500. The configuration manager 1534 may be capable of configuring different layers such as software layer 1530 and framework layer 1520 including Spark and distributed file system 1538 for supporting large-scale data processing. The resource manager 1536 may be capable of managing clustered or grouped computing resources mapped to or allocated for support of distributed file system 1538 and job scheduler 1528. In at least one embodiment, clustered or grouped computing resources may include grouped computing resource 1514 at data center infrastructure layer 1510. The resource manager 1536 may coordinate with resource orchestrator 1512 to manage these mapped or allocated computing resources.

In at least one embodiment, software 1532 included in software layer 1530 may include software used by at least portions of node C.R.s 1516(1)-1516(N), grouped computing resources 1514, and/or distributed file system 1538 of framework layer 1520. One or more types of software may include, but are not limited to, Internet web page search software, e-mail virus scan software, database software, and streaming video content software.

In at least one embodiment, application(s) 1542 included in application layer 1540 may include one or more types of applications used by at least portions of node C.R.s 1516 (1)-1516(N), grouped computing resources 1514, and/or distributed file system 1538 of framework layer 1520. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1534, resource manager 1536, and resource orchestrator 1512 may implement any number and type of self-modifying actions based on any amount and type of data acquired in any technically feasible fashion. Self-modifying actions may relieve a data center operator of data center 1500 from making possibly bad configuration decisions and possibly avoiding underutilized and/or poor performing portions of a data center.

The data center 1500 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1500. In at least one embodiment, trained or deployed machine learning models corresponding to one or more neural networks may be used to infer or predict information using resources described above with respect to the data center 1500 by using weight parameters calculated through one or more training techniques, such as but not limited to those described herein.

In at least one embodiment, the data center 1500 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1400 of FIG. 14—e.g., each device may include similar components, features, and/or functionality of the computing device(s) 1400. In addition, where backend devices (e.g., servers, NAS, etc.) are implemented, the backend devices may be included as part of a data center 1500, an example of which is described in more detail herein with respect to FIG. 15.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1400 described herein with respect to FIG. 14. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A: A method comprising: determining that a first version of a dataset has been updated to a second version of the dataset; based at least on the first version of the dataset being updated, analyze at least the second version of the dataset to identify first information related to at least one or more updates that occurred to the first version of the dataset; generating, based at least on one or more language models processing input data associated with the first information, output data representative of a data card that includes second information describing the second version of the dataset; and integrating the data card with at least one machine learning pipeline for model development and deployment.

B: The method of paragraph A, further comprising: determining, based at least on the first information, that at least one of one of one or more classes or one or more features has been added to the second version of the dataset, wherein the data card includes a new data card based at least on the at least one of the one or more classes or the one or more features being added to the second version of the dataset.

C: The method of either paragraph A or paragraph B, wherein the first version of the dataset is associated with a second data card, and wherein the method further comprises: determining, based at least on the first information, that at least one of one or more first classes or one or more first features from the first version of the dataset is similar to at least one of one or more second classes or one or more second features from the second version of the dataset, wherein the data card includes an updated portion of the second data card.

D: The method of any one of paragraphs A-C, further comprising: obtaining a template representing a format associated with the data card, wherein: the input data is further associated with the template; and the data card includes the second information arranged according to the format represented by the template.

E: The method of any one of paragraphs A-D, further comprising: sending, to one or more user devices, a document that includes one or more queries associated with the second version of the dataset; and receiving, from the one or more user devices, third information that is related to the one or more queries, wherein the input data is further associated with the third information.

F: The method of any one of paragraphs A-E, further comprising: determining, based at least on annotations associated with the second version of the dataset, whether one or more features associated with the second version of the dataset correspond to one or more protected classes, wherein the data card further indicates whether the one or more features correspond to the one or more protected classes.

G: The method of paragraph F, wherein the determining whether the one or more features correspond to the one or more protected classes comprises: comparing one or more first names represented by the annotations to one or more second names associated with the one or more protected classes; determining, based at least on the comparing, that the one or more first names are similar to the one or more second names; and determining that the one or more first names correspond to the one or more features.

H: The method of paragraph F, further comprising: determining, for at least a feature of the one or more features, a number of instances associated with categories corresponding to the feature; determining a variance associated with the feature based at least on the number of instances; and determining whether there is bias associated with the feature based at least on the variance, wherein the data card further indicates where there is bias associated with the feature.

I: A system comprising: one or more processors to: determine, based at least on analyzing a dataset, first information that is associated with the dataset; generate, based at least on one or more language models processing input data associated with the first information, output data associated with a data card that includes second information describing the dataset; and perform one or more model development operations based at least on the data card.

J: The system of paragraph I, wherein the one or more processors are further to: obtain a template representing a format associated with the data card, wherein: the input data is further associated with the template; and the data card includes the second information arranged according to the format represented by the template.

K: The system of either paragraph I or paragraph J, wherein the one or more processors are further to: send, to one or more user devices, a document that includes one or more queries associated with the dataset; and receive, from the one or more user devices, third information that is related to the one or more queries, wherein the input data is further associated with the third information.

L: The system of any one of paragraphs I-K, wherein the one or more processors are further to: determine, based at least on annotations associated with the dataset, whether one or more features associated with the dataset correspond to one or more protected classes, wherein the data card further indicates whether the one or more features correspond to the one or more protected classes.

M: The system of paragraph L, wherein the determination of whether the one or more features correspond to the one or more protected classes comprises: comparing one or more first names represented by the annotations to one or more second names associated with the one or more protected classes; determining, based at least on the comparing, that the one or more first names are similar to the one or more second names; and determining that the one or more first names correspond to the one or more features.

N: The system of paragraph L, wherein the one or more processors are further to: determine, for at least a feature of the one or more features, a number of instances associated with categories corresponding to the feature; determine a variance associated with the feature based at least on the number of instances; and determine whether there is bias associated with the feature based at least on the variance, wherein the data card further indicates where there is bias associated with the feature.

O: The system of any one of paragraphs I-N, wherein the one or more processors are further to: determine that the dataset has been updated from a first version of the dataset to a second version of the dataset; determine third information related to at least one or more updates that occurred to generate the second version of the dataset; and generate, based at least on the one or more language models processing second input data associated with the third information, second output data associated with a second data card that includes fourth information describing at least the one or more updates.

P: The system of paragraph O, wherein the one or more processors are further to: determine, based at least on the third information, that at least one of one of one or more classes or one or more features has been added to the second version of the dataset, wherein the second data card includes a new data card based at least on the at least one of the one or more classes or the one or more features being added to the second version of the dataset Q: The system of paragraph O, wherein the one or more processors are further to: determine, based at least on the third information, that at least one of one or more first classes or one or more first features from the first version of the dataset is similar to at least one or more second classes or one or more second features from the second version of the dataset, wherein the second data card includes an updated portion of the data card.

T: The system of any one of paragraphs I-Q, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more small language models (SLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

S: One or more processors comprising: processing circuitry to generate one or more data cards associated with one or more datasets based at least on one or more language models processing data associated with information corresponding to the one or more dataset, and store the one or more data cards in association with the one or more datasets in a digital format accessible for integration into at least one machine learning workflow.

T: The one or more processors of paragraph S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing operations using one or more small language models (SLMs); a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:
determining that a first version of a dataset has been updated to a second version of the dataset, the first version of the dataset being associated with a first data card that includes first information describing the first version of the dataset;

based at least on the first version of the dataset being updated, determining whether one or more data instances that were accessed using one or more first links associated with the first version of the dataset are still accessible using one or more second links associated with the second version of the dataset;

removing the one or more data instances from the second version of the dataset based at least on the one or more data instances not being accessible using the one or more second links associated with the second version of the dataset;

after removing the one or more data instances, analyzing at least the second version of the dataset to identify second information describing at least one or more updates that occurred to the first version of the dataset to result in the second version of the dataset;

generating, based at least on one or more language models processing input data that represents at least the second information, a second data card that includes at least the second information describing the at least the one or more updates to result in the second version of the dataset; and integrating the second data card with at least one machine learning pipeline for model development and deployment.

2. The method of claim 1, further comprising:
determining, based at least on the second information, that at least one of one of one or more classes or one or more features has been added to the second version of the dataset, wherein the second data card includes a new data card from the first data card based at least on the at least one of the one or more classes or the one or more features being added to the second version of the dataset.

3. The method of claim 1, further comprising:

determining, based at least on the second information, that at least one of one or more first classes or one or more first features from the first version of the dataset is similar to at least one of one or more second classes or one or more second features from the second version of the dataset, wherein the second data card includes an updated portion of the first data card.

4. The method of claim 1, further comprising:

obtaining a template representing a format associated with the second data card, wherein:

the input data is further representative of the template; and the second data card includes the second information arranged according to the format represented by the template.

5. The method of claim 1, further comprising:

sending, to one or more user devices, a document that includes one or more queries associated with the second version of the dataset; and receiving, from the one or more user devices, third information that is related to the one or more queries, wherein the input data is further representative of the third information.

6. The method of claim 1, further comprising:

determining, based at least on annotations associated with the second version of the dataset, whether one or more features associated with the second version of the dataset correspond to one or more protected classes, wherein the second data card further indicates whether the one or more features correspond to the one or more protected classes.

7. The method of claim 6, wherein the determining whether the one or more features correspond to the one or more protected classes comprises:

comparing one or more first names represented by the annotations to one or more second names associated with the one or more protected classes;

determining, based at least on the comparing, that the one or more first names are similar to the one or more second names; and determining that the one or more first names correspond to the one or more features.

8. The method of claim 1, wherein the first information from the first data card includes:

how data instances associated with the first version of the dataset were collected;

a size associated with the first version of the dataset;

a number of the data instances associated with the first version of the dataset;

a number of features associated with the first version of the dataset;

a distribution associated with the features;

whether one or more of the features are sensitive; or whether there is a bias associated with the first version of the dataset.

9. A system comprising:

one or more processors to:

determine that a first version of a dataset has been updated to a second version of the dataset, the first version of the dataset being associated with a first data card that includes first information describing the first version of the dataset;

based at least on the first version of dataset being updated, analyze the second version of the dataset to identify second information that describes one or more updates to the first version of the dataset to result in the second version of the dataset;

generate, based at least on one or more language models processing input data representative of the second information, output data associated with a second data card that includes at least a portion of the second information; and integrate the second data card with at least one machine learning pipeline for model development and deployment.

10. The system of claim 9, wherein the one or more processors are further to:

obtain a template representing a format associated with the second data card, wherein:

the input data is further representative of the template; and the second data card includes the at least the portion of the second information arranged according to the format represented by the template.

11. The system of claim 9, wherein the one or more processors are further to:

send, to one or more user devices, a document that includes one or more queries associated with the second version of the dataset; and receive, from the one or more user devices, third information that is related to the one or more queries, wherein the input data is further representative of the third information.

12. The system of claim 9, wherein the one or more processors are further to:

determine, based at least on one or more annotations associated with the second version of the dataset, whether one or more features associated with the second version of the dataset correspond to one or more protected classes, wherein the input data is further representative of the one or more features, and the second data card further indicates whether the one or more features correspond to the one or more protected classes.

13. The system of claim 12, wherein the determination of whether the one or more features correspond to the one or more protected classes comprises:

comparing one or more first names represented by the one or more annotations to one or more second names associated with the one or more protected classes;

determining, based at least on the comparing, that the one or more first names are similar to the one or more second names; and determining that the one or more first names correspond to the one or more features.

14. The system of claim 12, wherein the one or more processors are further to:

determine, for at least a feature of the one or more features, a number of instances associated with one or more categories corresponding to the feature;

determine a variance associated with the feature based at least on the number of instances; and determine whether there is bias associated with the feature based at least on the variance, wherein the second data card further indicates whether there is bias associated with the feature.

15. The system of claim 9, wherein the one or more processors are further to:

determine, based at least on the second information, that at least one of one of one or more classes or one or more features has been added to the second version of the dataset, wherein the second data card includes a new data card based at least on the at least one of the one or more classes or the one or more features being added to the second version of the dataset.

16. The system of claim 9, wherein the one or more processors are further to:

determine, based at least on the second information, that at least one of one or more first classes or one or more first features from the first version of the dataset is similar to at least one or more second classes or one or more second features from the second version of the dataset, wherein the second data card includes an updated portion of the first data card.

17. The system of claim 9, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing operations using one or more small language models (SLMs)

a system for performing operations using one or more vision language models (VLMs);

a system for performing operations using one or more multi-modal language models;

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

18. The system of claim 9, wherein to analyze the second version of the dataset to identify the second information that describes the dataset comprises:

generate a first embedding associated with a feature represented by the second version of the dataset;

generate a second embedding for a protected class;

determine that a similarity score between the first embedding and the second embedding satisfies a threshold score; and generate the second information to describe that the feature is associated with the protected class.

19. The system of claim 9, wherein the one or more processors are further to:

based at least on the first version of the dataset being updated, determine whether one or more data instances that were accessed using one or more first links associated with the first version of the dataset are still accessible using one or more second links associated with the second version of the dataset; and remove the one or more data instances from the second version of the dataset based at least on the one or more data instances not being accessible using the one or more second links associated with the second version of the dataset, wherein the second version of the dataset is analyzed after removing the one or more data instances.

20. One or more processors comprising:

processing circuitry to:

determine that a first version of a dataset has been updated to a second version of the dataset, the first version of the dataset being associated with a data card that describes the first version of the dataset;

based at least on the first version of the dataset being updated, analyze at least the second version of the dataset to identify first information associated with at least one or more updates that occurred to the first version of the dataset to result in the second version of the dataset;

determine, based at least on the first information and the data card, that at least one of one or more first classes or one or more first features from the first version of the dataset includes at least one of one or more second classes or one or more second features from the second version of the dataset;

determine, based at least on the first version of the dataset being updated and the at least one of the one or more first classes or the one or more first features including the at least one of the one or more second classes or the one or more second features, to update the data card;

generate, based at least on one or more language models processing the first information, an updated data card that includes at least second information describing the one or more updates added to the data card; and integrate the updated data card with at least one machine learning pipeline for model development and deployment.

* * * * *